(12) United States Patent
Kurosawa

(10) Patent No.: US 11,023,198 B2
(45) Date of Patent: Jun. 1, 2021

(54) ELECTRONIC STICKY NOTE PROCESSING SYSTEM AND APPARATUS

(71) Applicant: FUJI XEROX CO., LTD., Tokyo (JP)

(72) Inventor: Akira Kurosawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/558,159

(22) Filed: Sep. 2, 2019

(65) Prior Publication Data

US 2020/0301649 A1    Sep. 24, 2020

(30) Foreign Application Priority Data

Mar. 20, 2019  (JP) .............................. JP2019-052229

(51) Int. Cl.
    G06F 3/14     (2006.01)
    G09G 5/38     (2006.01)
    G09G 5/36     (2006.01)
(52) U.S. Cl.
    CPC ........... *G06F 3/1462* (2013.01); *G09G 5/363* (2013.01); *G09G 5/38* (2013.01); *G09G 2320/103* (2013.01); *G09G 2340/0464* (2013.01)
(58) Field of Classification Search
    None
    See application file for complete search history.

(56) References Cited

U.S. PATENT DOCUMENTS

| | | | | |
|---|---|---|---|---|
| 5,923,846 A * | 7/1999 | Gage | ....................... | H04L 29/06 379/93.12 |
| 2006/0005117 A1* | 1/2006 | Yamashita | ............ | G06F 40/169 715/205 |
| 2008/0022195 A1* | 1/2008 | Lyle | ....................... | G06Q 10/10 715/230 |
| 2009/0063640 A1* | 3/2009 | Lord | ....................... | H04L 51/34 709/206 |
| 2018/0203834 A1* | 7/2018 | Watanabe | ............ | G06F 3/04842 |

FOREIGN PATENT DOCUMENTS

JP    2010-066868    3/2010

* cited by examiner

*Primary Examiner* — Edward Martello
(74) *Attorney, Agent, or Firm* — JCIPRNET

(57) ABSTRACT

An information processing system includes first and second information processing apparatuses. The first information processing apparatus includes a first display controller. The first display controller performs control to display a parent message and a child message on a first display. The second information processing apparatus includes a second display controller and a receiver. The second display controller performs control to display a file attached to a parent message and a sticky note which shows the content of a child message on a second display. The receiver receives a file attached to a parent message and a child message from the first information processing apparatus. When the receiver has received the file and the child message, the second display controller performs control to display a sticky note which shows the content of the child message on the second display such that the sticky note is superposed on the file.

18 Claims, 33 Drawing Sheets

FIG. 6

| MEETING ID (610) | MEETING NAME (615) | DATE (620) | BOARD ID (625) | NUMBER OF ATTENDING USERS (630) | USER ID (635) |
|---|---|---|---|---|---|
| | | | | | |

| TASK ID (710) | MEETING ID (715) |
|---|---|
| | |

| BOARD ID (810) | BOARD TYPE (815) | BOARD PATTERN ID (820) | CREATED DATE (825) | CREATOR (830) |
|---|---|---|---|---|
| | | | | |

| BOARD ID (910) | MESSAGE ID (915) | FILE (925) |
|---|---|---|
| | | |

| ToDo ID | ToDo | PERSON IN CHARGE | DUE DATE | PROGRESS SITUATION | STICKY NOTE ID |
|---|---|---|---|---|---|
| 1110 | 1115 | 1120 | 1125 | 1130 | 1135 |

1100

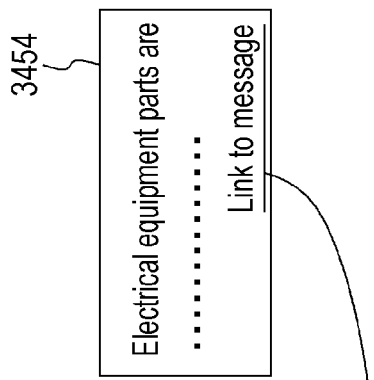
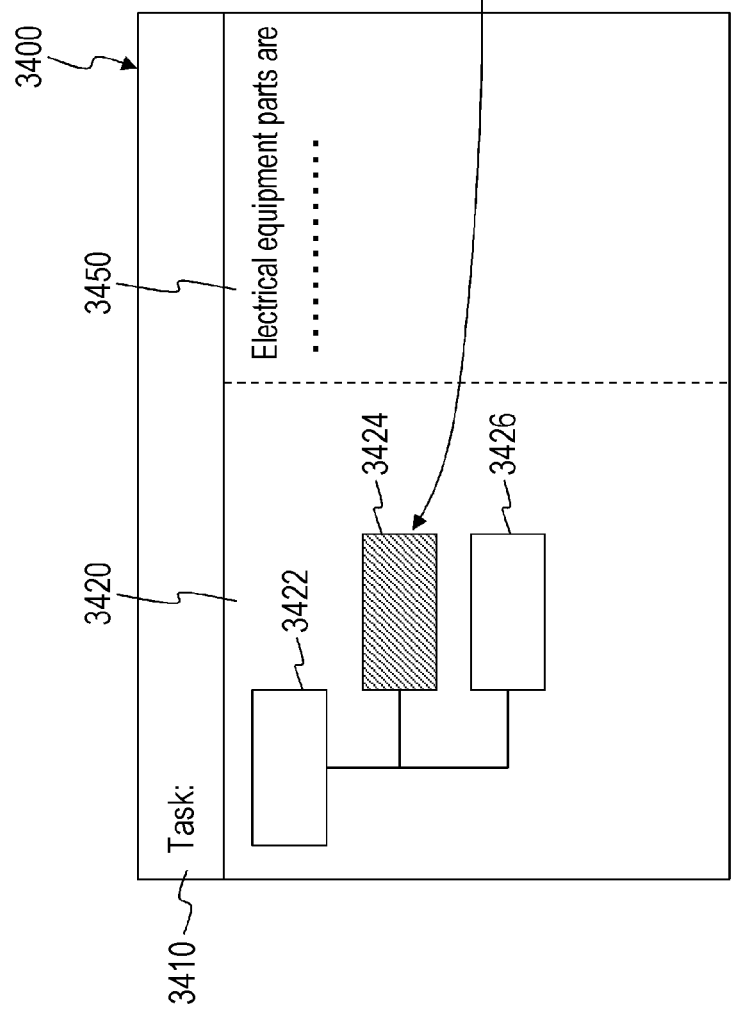

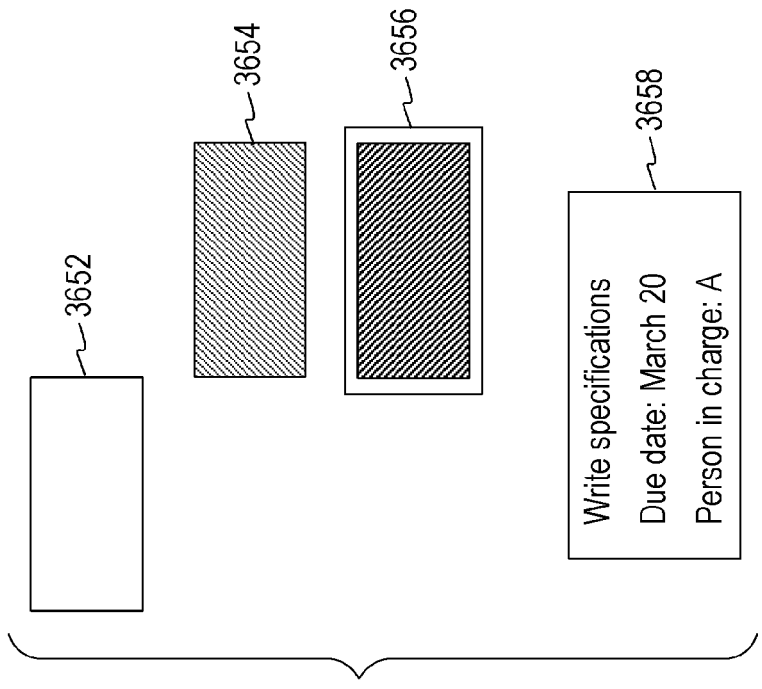
FIG. 36A
FIG. 36B
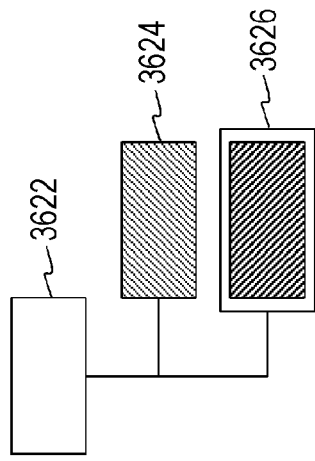
FIG. 36C

ELECTRONIC STICKY NOTE PROCESSING SYSTEM AND APPARATUS

CROSS-REFERENCE TO RELATED APPLICATIONS

This application is based on and claims priority under 35 USC 119 from Japanese Patent Application No. 2019-052229 filed Mar. 20, 2019.

BACKGROUND

(i) Technical Field

The present disclosure relates to an information processing system and apparatus.

(ii) Related Art

Japanese Unexamined Patent Application Publication No. 2010-066868 discloses the following technology to make it possible to efficiently and conveniently add a digital sticky note to a digital file as a result of creating the digital sticky note by associating it with the digital file. In a system in which a digital sticky note is added to a running application or a file opened by this application, when a window message of a running application or its related file is received, identification information concerning the application or its related file is obtained by using system hook dll. Then, a list of applications and files to which digital sticky notes may be attached is generated. From this list, a digital sticky note storing identification information about a certain application or its related file is created and stored. When a digital sticky note placed on an application or a file is shifted to another application or another file, the digital sticky note is displayed when the application or the file is displayed, and it is not displayed when the application or the file is not displayed.

SUMMARY

There may be a situation where users are having a discussion by using messages displayed on a display controlled by an information processing apparatus A, while users are having a review by using sticky notes displayed on a display controlled by an information processing apparatus B.

It is now assumed that, in reply to a message with an attached file, a message is received. In this case, if users are having a review using sticky notes by looking at the file attached to the message, they may also desire to check the content of the reply message.

Aspects of non-limiting embodiments of the present disclosure relate to an information processing system and apparatus that allow a user to check the content of a reply message in the form of a sticky note without user intervention, such as without a user having to input the content of the reply message into a sticky note.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including first and second information processing apparatuses. The first information processing apparatus includes a first display controller. The first display controller performs control to display a parent message and a child message on a first display. The child message is a message in reply to the parent message. The second information processing apparatus includes a second display controller and a receiver. The second display controller performs control to display a file attached to a parent message and a sticky note corresponding to the content of a child message on a second display such that the sticky note is superposed on the file. The receiver receives a file attached to a parent message and a child message from the first information processing apparatus. The child message is a message in reply to the parent message. When the receiver has received the file and the child message, the second display controller performs control to display a sticky note corresponding to the content of the child message on the second display such that the sticky note is superposed on the file.

BRIEF DESCRIPTION OF THE DRAWINGS

An exemplary embodiment of the present disclosure will be described in detail based on the following figures, wherein:

FIG. 6 illustrates an example of the data structure of a meeting information table;

FIG. 7 illustrates an example of the data structure of a task-meeting association table;

FIG. 8 illustrates an example of the data structure of a board information table;

FIG. 9 illustrates an example of the data structure of a board-message association table;

FIG. 11 illustrates an example of the data structure of a ToDo management table;

FIGS. 34A and 34B illustrate an example of processing executed in the exemplary embodiment;

FIGS. 36A, 36B, and 36C illustrate an example of processing executed in the exemplary embodiment;

DETAILED DESCRIPTION

An exemplary embodiment of the disclosure will be described below with reference to the accompanying drawings.

Figure 1:
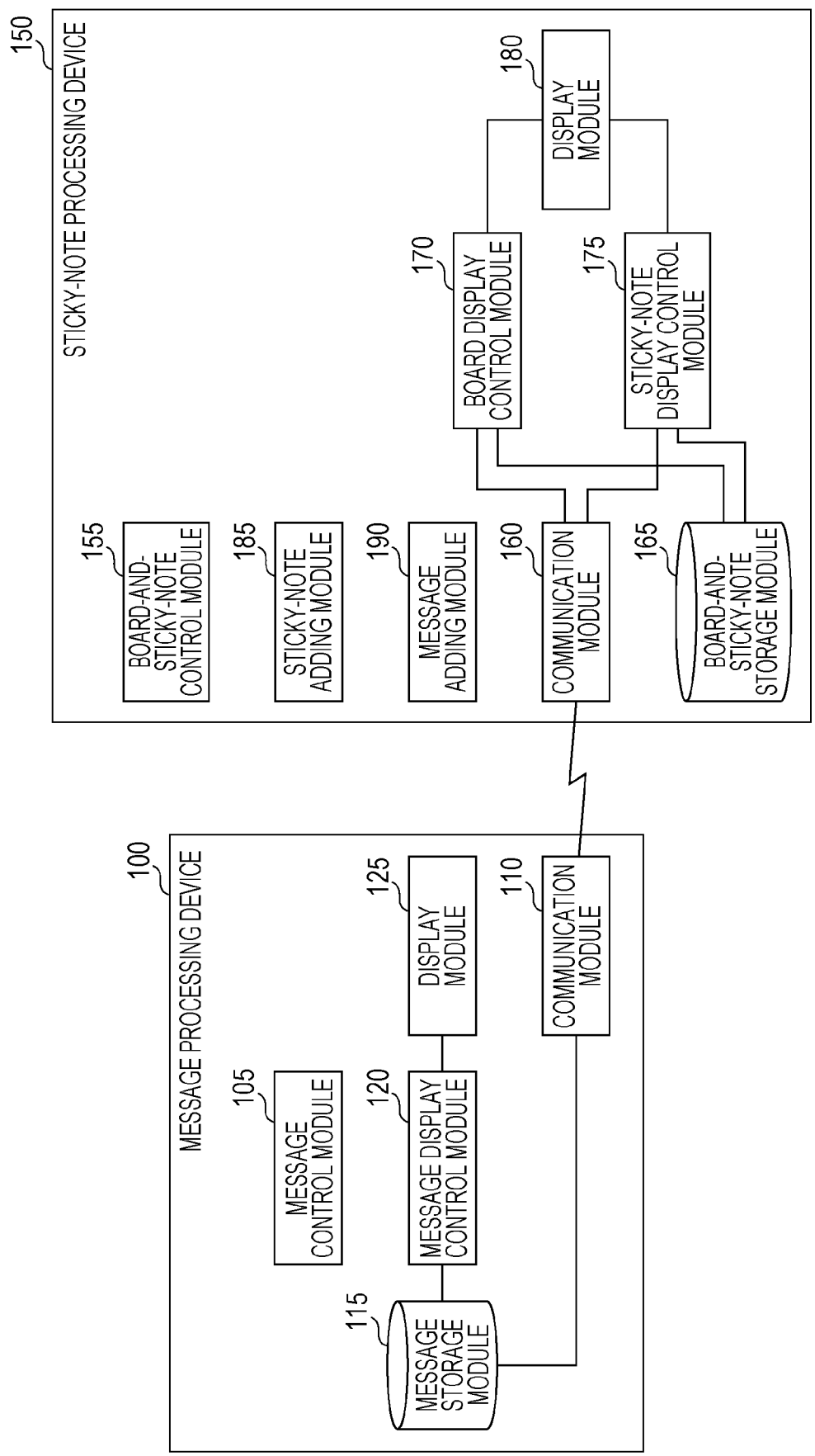
FIG. 1 is a block diagram illustrating conceptual modules forming an example of the configuration of the exemplary embodiment.

FIG. 1 is a block diagram illustrating conceptual modules forming an example of the configuration of the exemplary embodiment.

Generally, modules are software (computer programs) components or hardware components that can be logically separated from one another. The modules of the exemplary embodiment of the disclosure are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include a mere man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk, a random access memory (RAM), an external storage medium, a storage device using a communication network, and a register within a central processing unit (CPU).

As an example of an information processing system according to the exemplary embodiment, an information processing system including a message processing device 100 and a sticky-note processing device 150 shown in FIG. 1 will be described.

The message processing device 100 stores messages received from plural users by maintaining the parent-child relationship among the messages. The message processing device 100 may also display the parent-child relationship among the messages in a tree structure. For example, if a certain message is set as a parent message, a message issued in reply to this parent message may be set as a child message. More specifically, the message processing device 100 is used by multiple users and manages a message sent by a certain user and a message sent in reply to this message by another user (or may be the same user sent the first message) in a tree structure. The first message is a parent message, while the message in reply to the first message is a child message. A child message has one parent message, while a parent message has zero or more child messages. The message processing device 100 may be a bulletin board system, a chat system, or a message function of a social networking service (SNS).

The sticky-note processing device 150 is used in various situations. For example, the sticky-note processing device 150 may be used by multiple users to have a discussion by using sticky notes added to a board. In this case, the sticky-note processing device 150 serves as a device used in a typical example of the KJ method (affinity diagram). The sticky-note processing device 150 may also be used by a single user to review a document by checking sticky notes added to this document. In this case, the sticky-note processing device 150 serves as a device used by a single user to organize its thoughts in an example of the KJ method. The sticky-note processing device 150 may be used for assisting multiple users in having a meeting using sticky notes added to a board. Usage examples of the sticky-note processing device 150 will be discussed later with reference to FIGS. 4A through 4C. The sticky-note processing device 150 includes devices called a digital sticky-note control device, a digital sticky-note system, and a digital whiteboard. Sticky notes include digital sticky notes, digital cards, and annotations. A board and a document are examples of a file. In the following description, a board will be used as an example of a file. A file may be constituted by one page or multiple pages. If a file has multiple pages, the sticky-note processing device 150 may display a predetermined page (the first page, for example) of the file as a board, or a user of the sticky-note processing device 150 may select the page to be displayed as a board.

In this exemplary embodiment, with the collaboration between the message processing device 100 and the sticky-note processing device 150, a message in the message processing device 100 is converted into a sticky note to be used in the sticky-note processing device 150, or conversely, a sticky note in the sticky-note processing device 150 is converted into a message to be used in the message processing device 100. A file attached to a message in the message processing device 100 is used as a board in the sticky-note processing device 150 to which a sticky note is added.

The message processing device 100 includes a message control module 105, a communication module 110, a message storage module 115, a message display control module 120, and a display module 125. The message processing device 100 is an example of a first information processing apparatus.

The message control module 105 centrally controls the message processing device 100 and executes processing concerning messages.

The communication module 110 is connected to the message storage module 115 and is also connected to a communication module 160 of the sticky-note processing device 150 via a communication network. The communication module 110 communicates with the sticky-note processing device 150 so as to send a message stored in the message storage module 115 to the sticky-note processing device 150 and to receive a message sent from the sticky-note processing device 150 and store it in the message storage module 115. A message sent from the sticky-note processing device 150 is a message handled as a sticky note in the sticky-note processing device 150.

The message storage module 115 is connected to the communication module 110 and the message display control module 120. The message storage module 115 stores information concerning messages handled in the message processing device 100. The message storage module 115 stores a message information table 500 shown in FIG. 5, for example.

The display module 125 is connected to the message display control module 120. The display module 125 displays a message under the control of the message display control module 120. The display module 125 is a liquid crystal display or an organic electroluminescence (EL) display, for example. The display module 125 may be a display provided in the message processing device 100 or in a user terminal. The display module 125 may be displayed on a web browser of the user terminal. The display module 125 is an example of a first display. A display module 180 of the sticky-note processing device 150, which will be discussed later, is an example of a second display.

The message display control module 120 is connected to the message storage module 115 and the display module 125. The message display control module 120 performs control to display a parent message and a child message, which is a message in reply to the parent message, on the display module 125 or the display module 180 of the sticky-note processing device 150. The message display control module 120 may also generate information (specifically, a screen) to be displayed on the display module 125. To display a message on the display module 180, the message display control module 120 performs control via the communication module 110, a communication network, and the communication module 160. That is, the first display and the second display may be the same display. More specifically, the message display control module 120 performs control to display a message on the display module 180 by using a tab of a web browser, which will be discussed later.

When displaying messages, the message display control module 120 may simply display messages, or may also display messages so that the parent-child relationship among the messages can be identified. When simply displaying messages, the message display control module 120 may display messages in a list format. When displaying messages with their parent-child relationship, the message display control module 120 may display the messages in the following manner. The messages are linked with each other with lines indicating the top-bottom relationship among the messages, such as one is a parent message and another one is a child message. A line indicating the top-bottom relationship between messages may be a line linking a message on the top side and a message on the bottom side or an arrow line indicating the direction from a parent message to a child message.

The sticky-note processing device 150 includes a board-and-sticky-note control module 155, the communication module 160, a board-and-sticky-note storage module 165, a board display control module 170, a sticky-note display control module 175, the display module 180, a sticky-note adding module 185, and a message adding module 190. The sticky-note processing device 150 is an example of a second information processing apparatus. An example of a different information processing apparatus for the sticky-note processing device 150 is the message processing device 100.

The board-and-sticky-note control module 155 centrally controls the sticky-note processing device 150 and executes control concerning boards and sticky notes.

For example, the board-and-sticky-note control module 155 may restrict a user who is allowed to overwrite or delete a sticky note in the sticky-note processing device 150 to a user having posted a message associated with this sticky note in the message processing device 100.

Overwriting or deleting of a sticky note does not include changing of an attribute of the sticky note. That is, any user is allowed to change an attribute of a sticky note and also to make change to a message by changing an attribute of the sticky note.

The communication module 160 is connected to the board display control module 170 and the sticky-note display control module 175, and is also connected to the communication module 110 of the message processing device 100 via a communication network. The communication module 160 receives a file attached to a parent message and a child message, which is a message in reply to this parent message, from the message processing device 100.

Specific examples of processing of the communication module 160 are as follows. The communication module 160 communicates with the message processing device 100 so as to send a message added by the message adding module 190 to the message processing device 100. The communication module 160 also receives a message sent from the message processing device 100 and supplies it to the sticky-note adding module 185. The sticky-note adding module 185 then converts the message into a sticky note. If a file is attached to a received message, the communication module 160 also receives this file.

A parent message is a message with an attached file and is a message having a child message. The conditions for being a parent message may be provided, for example, a message can be a parent message on the condition that it is the first message concerning a task in the message processing device 100. A tree structure is generated for each task, and the root node of a tree structure is a parent message. A parent message may be a message selected by a user. The message first sent from the message processing device 100 to the sticky-note processing device 150 may be a parent message. A task corresponds to a title used in sending and receiving messages, and is also called a project, a thread, or a topic. Messages concerning a certain title are sent and received.

The board-and-sticky-note storage module 165 is connected to the board display control module 170 and the sticky-note display control module 175. The board-and-sticky-note storage module 165 stores information concerning boards and sticky notes handled by the sticky-note processing device 150. The board-and-sticky-note storage module 165 stores a meeting information table 600 shown in FIG. 6, a task-meeting association table 700 shown in FIG. 7, a board information table 800 shown in FIG. 8, a board-message association table 900 shown in FIG. 9, a sticky-note information table 1000 shown in FIG. 10, and a ToDo (to-do) management table 1100 shown in FIG. 11, for example.

The display module 180 is connected to the board display control module 170 and the sticky-note display control module 175. The display module 180 displays a board and sticky notes under the control of the board display control module 170 and the sticky-note display control module 175. The display module 180 is a liquid crystal display or an organic EL display, for example. The display module 180 may be a display provided in the sticky-note processing device 150 or in a user terminal. The display module 180 may be displayed on a web browser of the user terminal.

The board display control module 170 is connected to the communication module 160, the board-and-sticky-note storage module 165, and the display module 180. The board display control module 170 performs control to display a file attached to a parent message sent from the message processing device 100 on the display module 180 or the display module 125. The file may be displayed as a board to which a sticky note is added. The board display control module 170 may also generate information (specifically, a screen showing a board) to be displayed on the display module 180.

The sticky-note display control module 175 is connected to the communication module 160, the board-and-sticky-note storage module 165, and the display module 180. The sticky-note display control module 175 performs control to display a sticky note corresponding to the content of a child message sent from the message processing device 100 on the display module 180 or 125 such that the sticky note is superposed on a file (is added to a board) displayed by the board display control module 170. The sticky-note display control module 175 may also generate information (specifically, an image of a sticky note) to be displayed on the display module 180. To display a board and a sticky note on the display module 125, the board display control module 170 and the sticky-note display control module 175 perform control to respectively display a board and a sticky note on the display module 125 via the communication module 160, a communication network, and the communication module 110. That is, the first display and the second display may be the same display. More specifically, the board display control module 170 and the sticky-note display control module 175 may perform control to respectively display a board and a sticky note on the display module 125 by using a tab of a web browser.

When the communication module 160 has received a file and a child message, the sticky-note display control module 175 performs control to display a sticky note corresponding to the content of the child message on the display module 180 such that the sticky note is superposed on the file.

In addition to a sticky note corresponding to the content of a child message, the sticky-note display control module 175 may also generate a sticky note corresponding to the content of a parent message having an attached file and display the sticky note on the board. However, this is only optional.

When a parent message has an ancestor message in the message processing device 100, the sticky-note display control module 175 may also perform control to display a sticky note corresponding to the content of the ancestor message on the file. In this case, the message processing device 100 sends the ancestor message as well as the parent message (including the attached file) and its child message, and the sticky-note processing device 150 receives them.

The sticky-note display control module 175 may perform control to display a link by which a message associated with a sticky note can be traced from this sticky note. That is, the sticky-note display control module 175 may perform control to display the following link within a sticky note created in the sticky-note processing device 150. This link causes the message display control module 120 of the message processing device 100 to perform control to display the message associated with this sticky note. In other words, this link is not a link which can merely link to a certain item of information, but is a link for accessing a screen generated by the message display control module 120. To put it more specifically, in the display module 180 of the sticky-note processing device 150, a sticky note screen is displayed in a display area using a tab A of a web browser, while a message screen generated by the message display control module 120 of the message processing device 100 is displayed in a display area using a tab B of the web browser. That is, the use of the link makes is possible to display a message screen generated by the message processing device 100 and a sticky note screen generated by the sticky-note processing device 150 by using two tabs of a web browser. In such a display mode, when a user has selected the link within the sticky note displayed on the sticky note screen using the tab A, the message associated with this sticky note may be displayed on the message screen using the tab B.

The sticky-note display control module 175 may also perform control to display a link within a sticky note when a summary of the content of a message is described on the sticky note.

A summary of the content of a message is part of the content extracted from the message, that is, part of the content of the message is omitted. A specific example of a summary of the content of a message is a predetermined number of characters at the beginning of the message.

The sticky-note display control module 175 may perform control to display a sticky note, on the condition that at least one of the users of the sticky-note processing device 150 is a user of the message processing device 100. More specifically, current users of the sticky-note processing device 150 are extracted, and users of the message processing device 100 that has sent a parent message and an attached file are extracted. Then, logical AND is performed on the two groups of users. If one or more users are found, the file and a sticky note associated with the message are displayed. If no user is found, neither of the file nor the sticky note associated with the message is displayed.

When a sticky note is added to a file, the message adding module 190 adds the content of the sticky note as a child message in reply to a parent message sent from the message processing device 100. More specifically, the message adding module 190 converts, not a sticky note associated with a message sent from the message processing device 100, but a new sticky note generated in the sticky-note processing device 150 into a message to be handled in the message processing device 100 and sends the message to the message processing device 100 via the communication module 160. When converting a sticky note into a message, the message adding module 190 converts it as a child message in reply to a parent message having an attached file.

Examples of the timing at (or the condition for) which the content of a sticky note generated in the sticky-note processing device 150 is converted into a child message to be handled in the message processing device 100 are: when a meeting carried out by using the sticky-note processing device 150 has finished; when a new sticky note is stored in the board-and-sticky-note storage module 165; and when a user has provided an instruction to reflect the content of a sticky note in the message processing device 100.

The message adding module 190 may add the content of plural sticky notes as one message to the message processing device 100. The message adding module 190 may alternatively associate the content of one sticky note with one message. That is, sticky notes and messages are associated with each other based on a one-to-one correspondence.

Plural sticky notes to be added as one message may be all or some of the sticky notes added to a file. The message adding module 190 may select some of the sticky notes according to a predetermined condition and integrate them into one message. Examples of the predetermined condition are: (1) sticky notes are selected according to each user having created sticky notes; (2) sticky notes are selected according to each of the attributes of sticky notes; (3) sticky notes positioned close to each other on a file are selected; and (4) sticky notes are selected by a user regardless of the conditions (1) through (3). In the case of condition (3), whether sticky notes are positioned close to each other may be determined according to whether the center-to-center distance of sticky notes is smaller than or equal to a predetermined threshold.

An example of the timing at (or the condition for) which plural sticky notes are integrated into one message is when the number of sticky notes that satisfy one of the above-described conditions has reached a predetermined number or greater.

It is now assumed that the message adding module 190 associates one sticky note with one message and adds the message to the message processing device 10. In this case, when a message in reply to a first message is added to the message processing device 100, the sticky-note display control module 175 may perform control to display a sticky note associated with this reply message on a file by relating this sticky note to a sticky note associated with the first message.

If plural sticky notes have been integrated into one message, even when a message in reply to this message is received, it is unknown to which sticky note of the source message the reply message has responded, and the sticky-note display control module 175 is unable to display a sticky note associated with the reply message by relating it to the sticky note of the source message. Accordingly, the sticky-note display control module 175 performs control to display a sticky note of a reply message by relating it to that of a source message, on the condition that the source message has been generated from one sticky note.

Even if a sticky note is overwritten or deleted in the sticky-note processing device 150, the message adding module 190 does not overwrite or delete the message associated with this sticky note in the message processing device 100. That is, basically, although the sticky-note processing device 150 is able to overwrite or delete a sticky note in the sticky-note processing device 150, it is not allowed to change a message posted in the message processing device 100.

However, if a sticky note is overwritten in the sticky-note processing device 150, the message adding module 190 may describe the overwritten content of the sticky note as a new child message and adds the new child message to the message processing device 100. As discussed above, the sticky-note processing device 150 is not allowed to change a posted message, and if a sticky note is overwritten in the sticky-note processing device 150, the sticky-note processing device 150 adds a new message describing the overwritten content of the sticky note as a child message.

When a child message is added in reply to a parent message in the message processing device 100, the sticky-note adding module 185 adds a sticky note associated with the child message to a file. More specifically, the sticky-note adding module 185 converts a message received from the message processing device 100 via the communication module 160 into a sticky note. The sticky-note adding module 185 then supplies the sticky note to the sticky-note display control module 175 so that the sticky note can be displayed on a board.

The sticky-note adding module 185 may add a sticky note to a file by associating plural messages with one sticky note. The sticky-note adding module 185 and the sticky-note display control module 175 perform control to display a sticky note by associating plural messages with one sticky note.

Performing control to display a sticky note by associating plural messages with one sticky note may be applied, not only to when a message has been added, but also to when a sticky note screen is started for the first time by using a file attached to a parent message.

Plural messages to be associated with one sticky note may be all or some of the child messages of a parent message in the message processing device 100. The sticky-note adding module 185 may select some of the child messages according to a predetermined condition and integrate them into one sticky note. Examples of the predetermined condition are: (1) messages are selected according to each user having created messages, (2) messages are selected according to each of the attributes of messages, (3) messages are selected according to each of the branches in a tree structure, and (4) messages are selected by a user regardless of the conditions (1) through (3).

An example of the timing at (or the condition for) which plural messages are integrated into one sticky note is when the number of messages that satisfy one of the above-described conditions has reached a predetermined number or greater.

In the case of the condition (3), "according to each of the branches" means that, if plural child messages are placed under a certain parent message, messages are selected according to each child message. If another message (descendant message) is placed under a child message, the child message and the descendant message are selected. This will be discussed later more specifically with reference to the example in FIGS. 24 and 25.

The sticky-note display control module 175 may perform control to display a sticky note by changing the display attribute of the sticky note in accordance with a user instruction.

In this case, the message adding module 190 may change the corresponding attribute of a message associated with the sticky note in the message processing device 100 in accordance with a change in the display attribute of the sticky note.

The display attribute of a sticky note is an attribute concerning the appearance of the sticky note and is possible to change in response to a user instruction, unlike the content of a message. Examples of the display attribute are the shape, design, color, and size of a sticky note, a combination thereof, and an image, such as a mark, flag, and badge, added to a sticky note. The attribute of a message may be an attribute concerning the appearance of the message or a character string representing the type of attribute of a sticky note associated with this message.

For example, if a user has set the color of a certain sticky note to blue so that the sticky-note display control module 175 performs control to display this sticky note in blue, the message adding module 190 may append an attribute "urgent" to a message corresponding to the blue sticky note to be displayed in the message processing device 100, and also set the color of the title of the message to blue.

The message adding module 190 may not add a message to the message processing device 100 depending on the display attribute of a sticky note. For example, for a red sticky note, the message adding module 190 may not add a message to the message processing device 100.

A sticky note having a ToDo attribute may not be added as a message, but be added to a ToDo list. More specifically, the color of a ToDo sticky note may be set to be red, and a red sticky note may not be added to the message processing device 100 as a message, but be added to a ToDo management device as a sticky note indicating the content of a ToDo issue.

In another example, a sticky note concerning a ToDo issue that has already been done may not be added as a message. For example, the color of a sticky note concerning a ToDo issue that has already been done may be set to be pink, and a pink sticky note may not be added to the message processing device 100 as a message, but be added to the ToDo management device as a sticky note indicating that the ToDo issue has been done.

Figure 2:
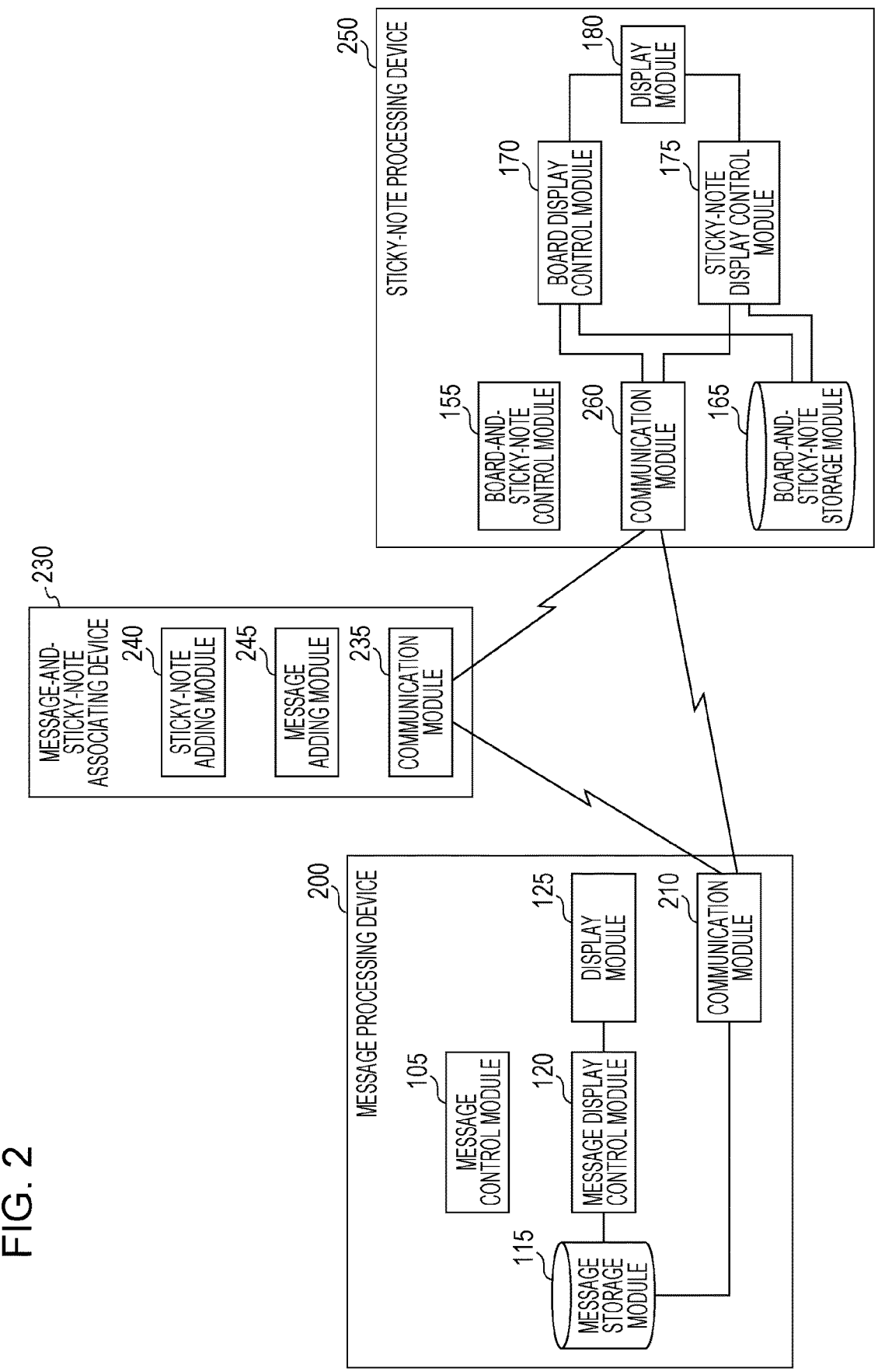
FIG. 2 is a block diagram illustrating conceptual modules forming an example of the configuration of the exemplary embodiment.

FIG. 2 is a block diagram illustrating conceptual modules forming an example of the configuration of the exemplary embodiment.

As another example of the information processing system according to the exemplary embodiment, an information processing system including a message processing device 200, a message-and-sticky-note associating device 230, and a sticky-note processing device 250 shown in FIG. 2 will be described. Elements identical to or similar to those of FIG. 1 are designated by like reference numerals, and an explanation thereof will thus be omitted. In the information processing system in the example of FIG. 2, the functions of the sticky-note adding module 185 and the message adding module 190 of the sticky-note processing device 150 shown in FIG. 1 are integrated into the message-and-sticky-note associating device 230.

The message processing device 200 includes a message control module 105, a communication module 210, a message storage module 115, a message display control module 120, and a display module 125. The message processing device 200 is an example of the first information processing apparatus.

The communication module 210 is connected to a communication module 260 of the sticky-note processing device 250 and a communication module 235 of the message-and-sticky-note associating device 230 via a communication network. The message processing device 200 may communicate with the sticky-note processing device 250 always via the communication module 235.

The message-and-sticky-note associating device 230 includes the communication module 235, a sticky-note adding module 240, and a message adding module 245. The message-and-sticky-note associating device 230 is an example of a third information processing apparatus. The message-and-sticky-note associating device 230 has a function as a web service called IF This Then That (IFTTT). That is, the message-and-sticky-note associating device 230 has a function of linking a web service provided by the message processing device 200 and that by the sticky-note processing device 250.

The communication module 235 is connected to the communication module 210 of the message processing device 200 and the communication module 260 of the sticky-note processing device 250 via a communication network. The communication module 235 supplies information concerning a message received from the message processing device 200 to the sticky-note adding module 240 and sends information concerning a sticky note, which is a processing result of the sticky-note adding module 240, to the sticky-note processing device 250. The communication module 235 also supplies information concerning a sticky note received from the sticky-note processing device 250 to the message adding module 245 and sends information concerning a message, which is a processing result of the message adding module 245, to the message processing device 200.

The sticky-note adding module 240 has a function equivalent to that of the sticky-note adding module 185. When a child message is added to a parent message in the message processing device 200, the sticky-note adding module 240 adds a sticky note associated with the child message to a file as a sticky note to be added to the sticky-note processing device 250. More specifically, upon receiving a message from the message processing device 200, the sticky-note adding module 240 converts the message into a sticky note to be added to the sticky-note processing device 250. In this case, the sticky-note adding module 240 converts the message into a sticky note as a child message of its parent message. The message-and-sticky-note associating device 230 receives information concerning the parent message (such as a message ID of the parent message), together with the child message, from the message processing device 200. In this case, the message processing device 200 sends information concerning the parent message with an attached file, which has already been sent to the sticky-note processing device 250, to the message-and-sticky-note associating device 230, together with information concerning the new message generated in the message processing device 200.

The message adding module 245 has a function equivalent to that of the message adding module 190. When a sticky note is added to a file in the sticky-note processing device 250, the message adding module 245 describes the content of the sticky note as a child message of its parent message to be added to the message processing device 200. More specifically, upon receiving a sticky note from the sticky-note processing device 250, the message adding module 245 converts the sticky note into a message to be handled in the message processing device 200. In this case, the message adding module 245 converts the sticky note into a message as a child message of its parent message. The message-and-sticky-note associating device 230 receives information concerning the parent message (such as a message ID of the parent message), together with the sticky note, from the sticky-note processing device 250. In this case, the sticky-note processing device 250 sends information concerning the parent message with an attached file, which has already been received from the message processing device 200, to the message-and-sticky-note associating device 230, together with information concerning the new sticky note generated in the sticky-note processing device 250.

The sticky-note processing device 250 includes a board-and-sticky-note control module 155, the communication module 260, a board-and-sticky-note storage module 165, a board display control module 170, a sticky-note display control module 175, and a display module 180. The sticky-note processing device 250 is an example of the second information processing apparatus. The sticky-note processing device 250 is a device equivalent to the sticky-note processing device 150 shown in FIG. 1 without the sticky-note adding module 185 and the message adding module 190. The sticky-note processing device 250 instructs the message-and-sticky-note associating device 230 to perform processing equivalent to the functions of the sticky-note adding module 185 and the message adding module 190.

The communication module 260 is connected to the communication module 210 of the message processing device 200 and the communication module 235 of the message-and-sticky-note associating device 230 via a communication network. The sticky-note processing device 250 may communicate with the message processing device 200 always via the communication module 235.

Figure 3:
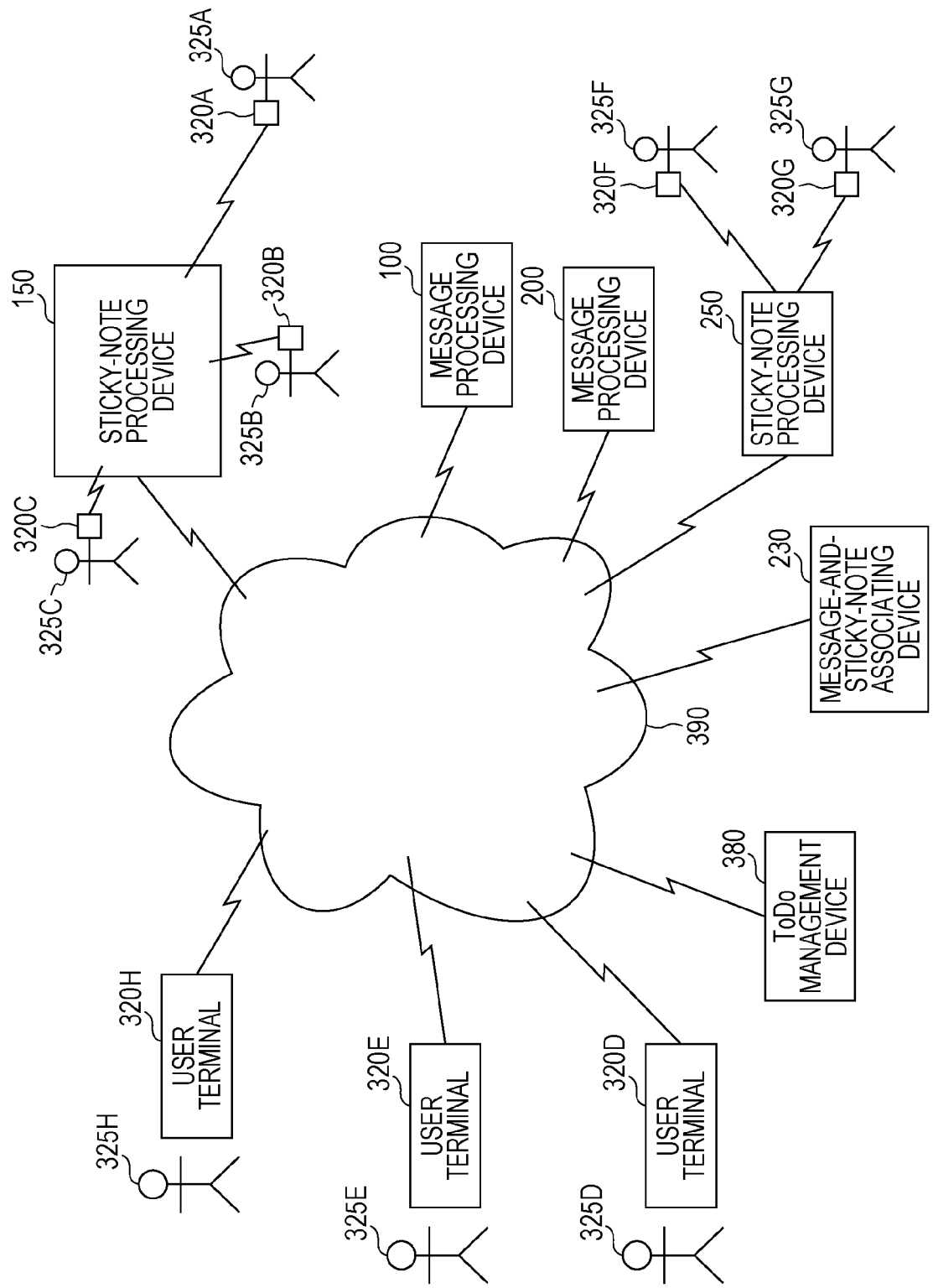
FIG. 3 illustrates an example of the system configuration utilizing the exemplary embodiment.

FIG. 3 illustrates an example of the system configuration utilizing the exemplary embodiment.

The sticky-note processing device 150, a user terminal 320A owned by a user 325A, a user terminal 320B owned by a user 325B, and a user terminal 320C owned by a user 325C are connected to each other via a communication network (typically, a wireless communication network, but may be a wired communication network). The users 325A, 325B, and 325C are currently holding a meeting by using the sticky-note processing device 150. Users 325D and 325E who belong to the same group X as the users 325A, 325B, and 325C can exchange messages with the users 325A, 325B, and 325C by using the message processing device 100, though they are not attending the meeting.

The sticky-note processing device 250, a user terminal 320F owned by a user 325F, and a user terminal 320G owned by a user 325G are connected to each other via a communication network. The users 325F and 325G are currently holding a meeting by using the sticky-note processing device 250. A user 325H who belongs to the same group Y as the users 325F and 325G can exchange messages with the users 325F and 325G by using the message processing device 100, though the user 325H is not attending the meeting.

The message processing device 100 manages a bulletin board concerning tasks (including projects) conducted by the two groups (group X of the users 325A through 325E and group Y of the users 325F through 325H).

A ToDo issue may be assigned to the users 325D, 325E, and 325H who are not in the meeting held by using the sticky-note processing device 150 or that by using the sticky-note processing device 250. Examples of the user terminals 320 are a personal computer (PC) (including a laptop PC) having a communication function and a mobile information communication device, such as a cellular phone, a smartphone, a mobile device, and a wearable computer, having a communication function.

The sticky-note processing devices 150 and 250, the message processing devices 100 and 200, the message-and-sticky-note associating device 230, a ToDo management device 380, and the user terminals 320D, 320E, and 320H are connected to each other via a communication network 390. The communication network 390 may be a wireless or wired medium, or a combination thereof, and may be, for example, the Internet or an intranet as a communication infrastructure. The ToDo management device 380 manages ToDo lists of the users 325 and generates a screen displaying a ToDo list (hereinafter called a ToDo list screen, which is an example of a progress screen) that can be read by the individual users 325. The functions of the message processing devices 100 and 200, the sticky-note processing devices 150 and 250, the message-and-sticky-note associating device 230, and the ToDo management device 380 may be implemented as cloud services. The system configuration shown in FIG. 3 may be used in a client-server model using the message processing devices 100 and 200, the sticky-note processing devices 150 and 250, and the ToDo management device 380 as servers and the user terminals 320 as clients.

The information processing system according to the exemplary embodiment executes the following processing, for example.

In a typical usage mode of the information processing system, the message processing device 100 or 200 is used in asynchronous communication, while the sticky-note processing device 150 or 250 is used in a face-to-face communication. For example, users send messages to the message processing device 100 or 200 by using the corresponding user terminals, but do not necessarily respond to the messages in real time. Instead, the users can display and send messages when they can, such as when they attend a meeting. In contrast, the sticky-note processing device 150 or 250 is used by multiple users to have a discussion, for example, in the same place, and the start time and the end time at which the sticky-note processing device 150 or 250 is used are fixed.

Typically, a task is carried out with a combination of asynchronous communication and face-to-face communication. Asynchronous communication is performed by all users participating in a task, while face-to-face communication tends to be performed only by some representatives, such as group leaders, of the task.

When an issue arises in asynchronous communication, face-to-face communication is likely to be performed. In this case, users can carry out face-to-face communication efficiently if they have a discussion by looking at a file attached to a message handled in asynchronous communication and the related messages.

It may also be desirable to allow a task member who is not in the discussion (user 325D, for example, participating in asynchronous communication but not in face-to-face communication) to share the discussion results obtained in face-to-face communication.

In the system including the message processing device 100 and the sticky-note processing device 150 or in the system including the message processing device 200, the message-and-sticky-note associating device 230, and the sticky-note processing device 250, the sticky-note processing device 150 or 250 performs control to display on a display module a file attached to a parent message and a sticky note describing the content of a child message on the file used as a board, while the message processing device 100 or 200 adds the content of a new sticky note as a child message of its parent message and displays the child message on a display module.

Figure 4A:
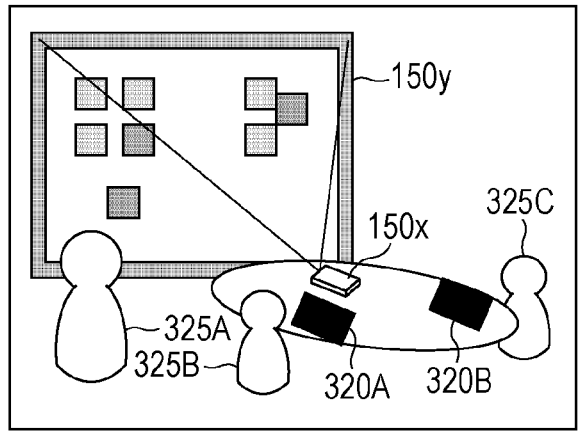
FIGS. 4A through 4C illustrate usage examples of a user terminal and a sticky-note processing device in a location such as a meeting room where the exemplary embodiment is used.
Figure 4B:
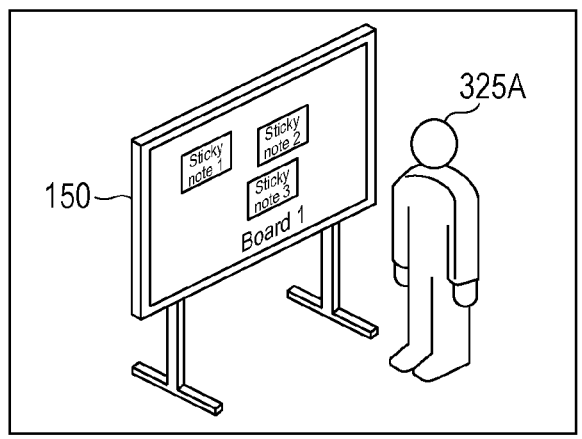
Figure 4C:
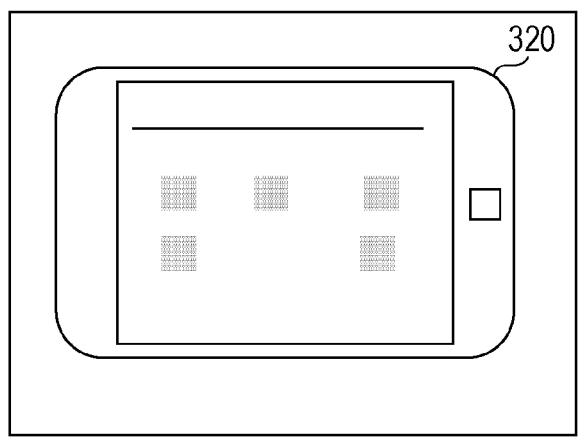

FIGS. 4A through 4C illustrate usage examples of the user terminal 320 and the sticky-note processing device 150 in a meeting room, for example. The displays of sticky-note processing devices 150x, 150y shown in FIG. 4A and the display of a sticky-note processing device 150 shown in FIG. 4B correspond to the display module 180 shown in FIGS. 1 and 2.

As shown in the example of FIG. 4A, users (users 325B and 325C) and a facilitator (user 325A) gather in a meeting room, for example. The user 325B uses the user terminal 320A, while the user 325C uses the user terminal 320B. Typically, a terminal device, such as the user terminal 320A, is assigned to each user. As in the user terminal 320 shown in FIG. 4C, the terminal device is a tablet terminal having a size equivalent to a notebook (A4 or B5 size, about 7 to 10 inches, for example), and is operated with a finger or a pen. A user creates a sticky note on which text, handwritten characters, and drawings are described. The terminal device is not restricted to a tablet terminal, and may be a PC (including a laptop PC) with a keyboard and a mouse.

The sticky-note processing device 150x shown in FIG. 4A has a projector, and displays a message screen and a sticky note screen showing a board and sticky notes on the projector. The sticky-note processing device 150y, which is a digital whiteboard, detects the movement of a finger or a pen of the facilitator (user 325A) so as to receive an operation for adding a sticky note to the board or shifting, overwriting, or deleting a sticky note. For example, a pen is provided for the sticky-note processing device 150y and is kept in a predetermined pen holder. The sticky-note processing device 150y detects that the pen is removed from the pen holder, that is, the facilitator (user 325A), for example, has lifted the pen, and that the pen tip has touched the sticky-note processing device 150y (the position of the pen tip on the screen) so as to receive an operation on a board or a sticky note. For example, plural pens (such as black, red, and blue pens) are kept in the pen holder, and a sensor, which is turned ON and OFF in accordance with the gravity of a pen, is integrated in the pen holder to detect which one of the plural pens is being used. The entire display screen of the sticky-note processing device 150y is a touch sensor and detects the position and the pressure of a pen touching the display screen. In this example, the pen is turned ON and OFF under the control of the pen holder. However, the provision of the pen holder may be omitted, in which case, the pen may be ON and OFF by itself. In this example, plural pens having different colors are kept in the pen holder. However, only a single pen may be provided and the color of the pen may be changed as follows. A color palette is provided on part of the display screen, and the pen (or an object similar to a pen) touches a desired color so as to change the color of the pen. Alternatively, the pen may be provided with a function (such as a button or a slider) of giving an instruction to change the color.

The sticky-note processing device 150 may be a digital board, such as that shown in FIG. 4B. The digital board usually has a large screen of about 80 inches, for example, and is at least larger than the display of the user terminal 320. The display of the sticky-note processing device 150 is a touchscreen and detects the position and the pressure of a finger or a pen, for example, touching the screen.

Figure 5:
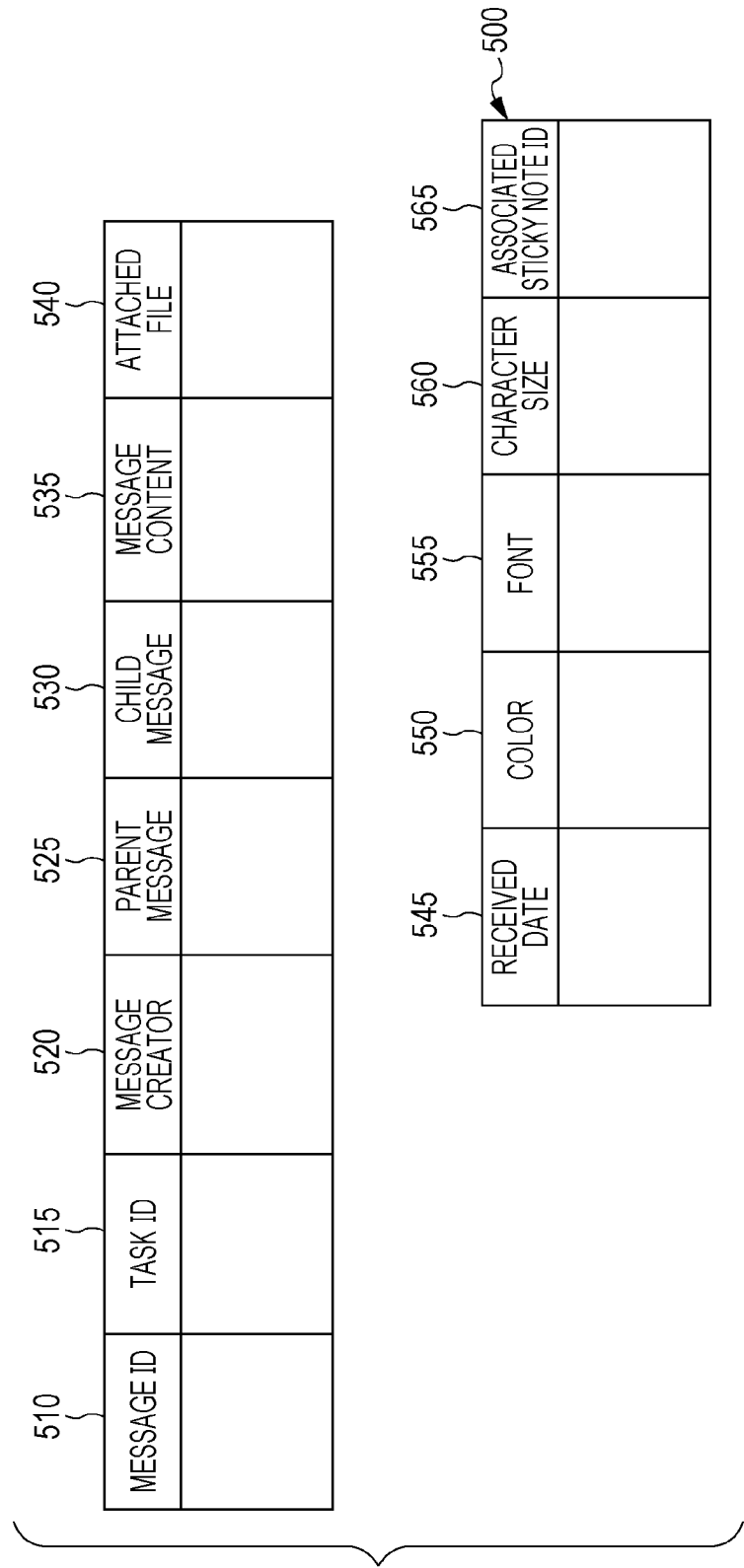
FIG. 5 illustrates an example of the data structure of a message information table.

FIG. 5 illustrates an example of the data structure of the message information table 500. The message information table 500 is stored in the message control modules 105 of the message processing devices 100 and 200 (hereinafter simply called the message processing device 100, however, a description concerning the message processing device 100 also applies to the message processing device 200 unless otherwise stated). The message information table 500 corresponds to information concerning a message. The message information table 500 has a message ID field 510, a task ID field 515, a message creator field 520, a parent message field 525, a child message field 530, a message content field 535, an attached file field 540, a received date field 545, a color field 550, a font field 555, a character size field 560, and an associated sticky note ID field 565. The message ID field 510 stores information for uniquely identifying a subject message (more specifically, a message ID) in the exemplary embodiment. The task ID field 515 stores information for uniquely identifying a task (more specifically, a task ID) in the exemplary embodiment. The message creator field 520 indicates a creator of the subject message. The creator is a member of the task. The parent message field 525 indicates a parent message of the subject message. The child message field 530 indicates a child message of the subject message. There may be no child message of the subject message. Conversely, the subject message may have plural child messages. The message content field 535 indicates the content of the subject message. The attached file field 540 stores a file attached to the subject message. The received date field 545 indicates the time and date (year, month, day, hour, minute, second, millisecond, or a combination thereof) at and on which the subject message is received by the message processing device 100 or is sent by the creator. The color field 550 indicates the display color of the subject message. The font field 555 indicates the display font of the subject message. The character size field 560 indicates the display character size of the subject message. The associated sticky note ID field 565 stores the sticky note ID of a sticky note associated with the subject message. The sticky note ID may be obtained as follows. When the message processing device 100 has sent a message to the sticky-note processing device 150, it receives the sticky note ID of the sticky note associated with this message from the sticky-note processing device 150. When the message processing device 100 has received a message from the sticky-note processing device 150, it receives the sticky note ID appended to this message. The color in the color field 550, the font in the font field 555, and the character size in the character size filed 560 are examples of the display attributes of a message.

FIG. 6 illustrates an example of the data structure of the meeting information table 600. The meeting information table 600 is stored in the board-and-sticky-note storage modules 165 of the sticky-note processing devices 150 and 250 (hereinafter simply called the sticky-note processing device 150, however, a description concerning the sticky-note processing device 150 also applies to the sticky-note processing device 250 unless otherwise stated). The meeting information table 600 corresponds to information concerning a meeting held by using the sticky-note processing device 150. The meeting information table 600 has a meeting ID field 610, a meeting name field 615, a date field 620, a board ID field 625, a number-of-attending-users field 630, and a user ID field 635. The meeting ID field 610 stores information for uniquely identifying a subject meeting (more specifically, a meeting ID) in the exemplary embodiment. The meeting name field 615 indicates the name of the subject meeting. The date field 620 indicates the time and date (year, month, day, hour, minute, second, millisecond, or a combination thereof) at and on which the subject meeting is held or a period of the meeting. The board ID field 625 stores information for uniquely identifying a board (that is, a board ID) used in the subject meeting in the exemplary embodiment. The number-of-attending-users field 630 indicates the number of users attending the subject meeting. The user ID field 635 stores information for uniquely identifying users (such as a user ID list) attending the subject meeting in the exemplary embodiment.

FIG. 7 illustrates an example of the data structure of the task-meeting association table 700. The task-meeting association table 700 is stored in the board-and-sticky-note storage module 165 of the sticky-note processing device 150. The task-meeting association table 700 associates a task carried out by using the message processing device 100 with a meeting held by using the sticky-note processing device 150. The task-meeting association table 700 has a task ID field 710 and a meeting ID field 715. The task ID field 710 stores a task ID. The meeting ID field 715 stores a meeting ID of a meeting associated with the task represented by the task ID.

FIG. 8 illustrates an example of the data structure of the board information table 800. The board information table 800 is stored in the board-and-sticky-note storage module 165 of the sticky-note processing device 150. The board information table 800 has a board ID field 810, a board type field 815, a board pattern ID field 820, a created date field 825, and a creator field 830. The board ID field 810 stores a board ID of a subject board. The board type field 815 indicates a board type of the subject board. The board pattern ID field 820 stores a board pattern ID of a board pattern of the subject board used as a background. Examples of the board pattern are a tabular form and a drawing. The created date field 825 indicates the time and date at and on which the subject board is created. The creator field 830 indicates the creator of the subject board.

FIG. 9 illustrates an example of the data structure of the board-message association table 900. The board-message association table 900 is stored in the board-and-sticky-note storage module 165 of the sticky-note processing device 150. The board-message association table 900 has a board ID field 910, a message ID field 915, and a file field 920. The board ID field 910 stores a board ID of a subject board. The message ID field 915 stores information for uniquely identifying a subject message (more specifically, a message ID) in the exemplary embodiment. The subject message corresponds to a parent message with an attached file sent from the message processing device 100. The file field 920 stores a file to be handled as the subject board. This file is a file attached to the parent message sent from the message processing device 100.

Figure 10:
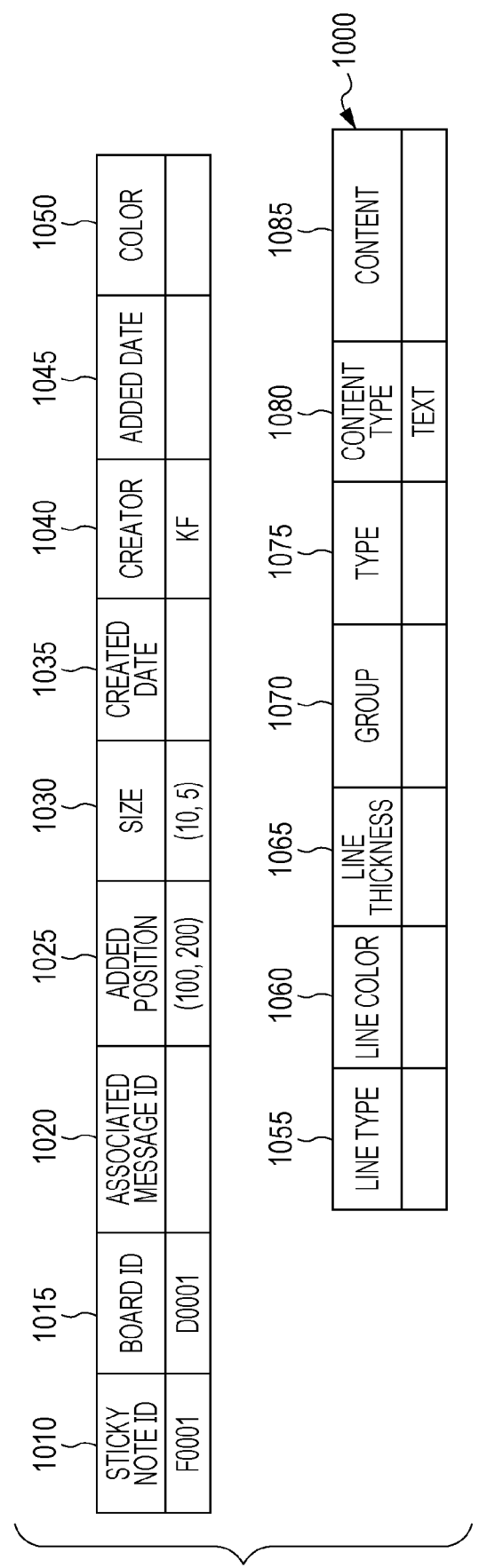
FIG. 10 illustrates an example of the data structure of a sticky-note information table.

FIG. 10 illustrates an example of the data structure of the sticky-note information table 1000. The sticky-note information table 1000 is stored in the board-and-sticky-note storage module 165 of the sticky-note processing device 150. Sticky note information includes information indicating the attributes of a sticky note. The sticky-note information table 1000 shows the attributes of a sticky note in a table format. The sticky-note information table 1000 has a sticky note ID field 1010, a board ID field 1015, an associated message ID field 1020, an added position field 1025, a size field 1030, a created date field 1035, a creator field 1040, an added date field 1045, a color field 1050, a line type field 1055, a line color field 1060, a line thickness field 1065, a group field 1070, a type field 1075, a content type field 1080, and a content field 1085. Items of information in the individual fields of the table correspond to the attributes of a sticky note. The sticky note ID field 1010 stores a sticky note ID of a subject sticky note. The board ID field 1015 stores the board ID of a board to which the subject sticky note is added. The associated message ID field 1020 stores a message ID of a message associated with the subject sticky note. If the subject sticky note has been created in accordance with a message sent from the message processing device 100 or if a message converted from a sticky note generated in the sticky-note processing device 150 has been sent to the message processing device 100, the subject sticky note has an associated message. The added position field 1025 indicates the position of the subject sticky note added to the board (such as the position of the center or the top left of the sticky note on the board). The position of the sticky note is represented by the coordinates on the XY coordinate system of the board, for example. The size field 1030 indicates the size of the subject sticky note. If the sticky note is rectangular, for example, the width and the height of the sticky note are indicated as the size. The created date field 1035 indicates the time and date at and on which the subject sticky note is created. The creator field 1040 indicates the creator (user ID) of the sticky note. The creator field 1040 may alternatively indicate an information processing apparatus (device ID of the user terminal 320 or the sticky-note processing device 150) that has created the sticky note. The added date field 1045 indicates the time and date at and on which the subject sticky note is added to the board. The color field 1050 indicates the display color of the sticky note. The line type field 1055 indicates the line type (such as solid lines, dotted lines, broken lines, wavy lines, and double lines) used for displaying the sticky note. The line color field 1060 indicates the color of the lines for displaying the sticky note. The line thickness field 1065 indicates the thickness of the lines for displaying the sticky note. The group field 1070 stores information concerning a group of the sticky note. The group field 1070 may store information indicating whether the sticky note belongs to a group, and if it belongs to a group, the group field 1070 may store the group ID of this group or the ID of another sticky note belonging to this group. The type field 1075 indicates the type of subject sticky note. Examples of the types of sticky notes are a ToDo type on which a thing to do is described, a message type, which corresponds to a message sent from the message processing device 100, and a regular type, which is neither of the ToDo type nor the message type and is used in a meeting, for example. The content type field 1080 indicates the content type of sticky note. Examples of the content type are text information, vector data representing an object such as handwritten characters or a drawing, voice information, still image information such as a photo, video information, or information indicating a combination thereof. The content field 1085 describes the content of the sticky note. More specifically, if the sticky note is of a message type, the content field 1085 describes the content of this message. If the sticky note is of a ToDo type, the content field 1085 describes at least a thing to do. The content field 1085 may also describe a person in charge and a progress situation. The color in the color field 1050, the line type in the line type field 1055, the line color in the line color field 1060, and the line thickness in the line thickness field 1065 are examples of the display attributes of the sticky note.

Figure 11:
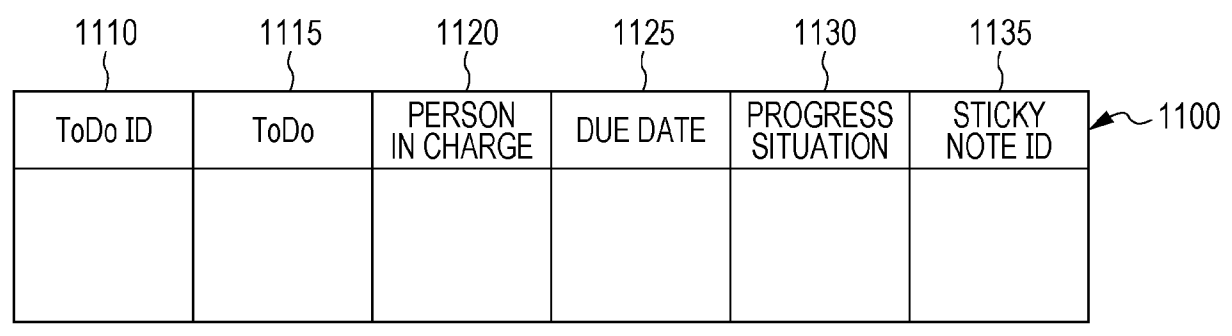

FIG. 11 illustrates an example of the data structure of the ToDo management table 1100. The ToDo management table 1100 is stored in the board-and-sticky-note storage module 165 of the sticky-note processing device 150. The ToDo management table 1100 has a ToDo ID field 1110, a ToDo field 1115, a person-in-charge field 1120, a due date field 1125, a progress situation field 1130, and a sticky note ID field 1135. The ToDo ID field 1110 stores information for uniquely identifying a subject ToDo issue (more specifically, a ToDo ID) in the exemplary embodiment. The ToDo field 1115 indicates the subject ToDo issue. The person-in-charge field 1120 indicates a person in charge of the subject ToDo issue. The due date field 1125 indicates a due date of the subject ToDo issue. The progress situation field 1130 indicates the progress situation of the ToDo issue. The sticky note ID field 1135 indicates the sticky note ID of a sticky note on which the ToDo issue is described. The ToDo management table 1100 associates a ToDo issue with a sticky note.

Figure 12:
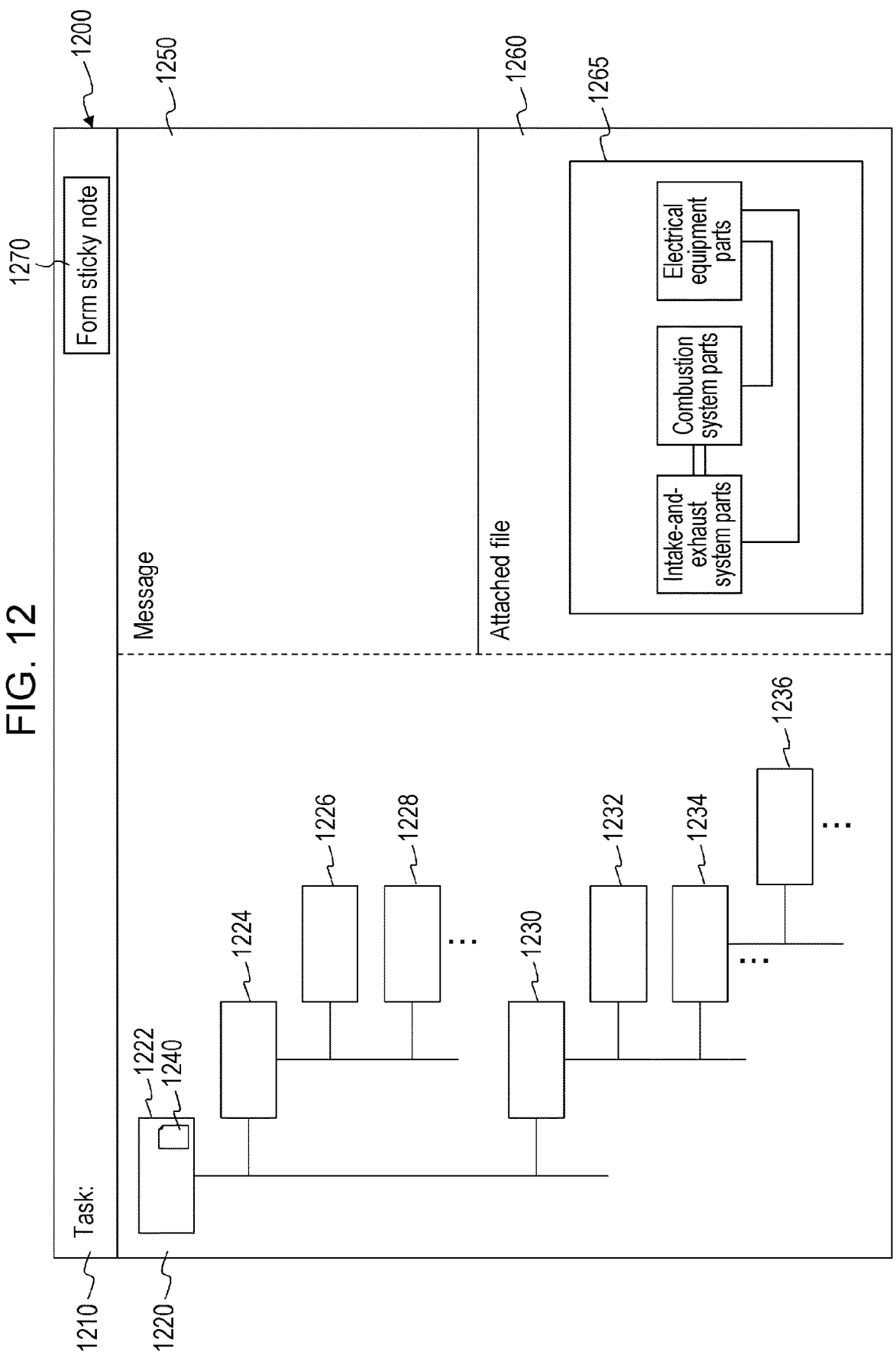
FIG. 12 illustrates an example of a screen displayed under the control of a message processing device.

FIG. 12 illustrates an example of a screen 1200 on the display module 125 displayed under the control of the message display control module 120 of the message processing device 100.

On the screen 1200, a task display area 1210, a message tree structure display area 1220, a message content display area 1250, an attached file display area 1260, and a sticky note forming button 1270 are displayed.

In the task display area 1210, the name of a task about which messages are exchanged is displayed.

In the message tree structure display area 1220, messages are displayed.

In the message content display area 1250, the content of a message selected in the message tree structure display area 1220 is displayed.

If a file is attached to a message selected in the message tree structure display area 1220, the content of the file is displayed in the attached file display area 1260.

The sticky note forming button 1270 is used for sending a predetermined message in the message tree structure display area 1220, a message selected in the message tree structure display area 1220, or all the messages in the message tree structure display area 1220 to the sticky-note processing device 150. The predetermined message in the message tree structure display area 1220 may be the first message 1222 in the task, for example.

Messages form a tree structure.

The example of FIG. 12 shows that the message 1222 has messages 1224 and 1230 as child messages, the message 1224 has messages 1226 and 1228 as child messages, the message 1230 has messages 1232 and 1234 as child messages, and the message 1234 has a message 1236 as a child message. A document icon 1240 is appended to the message 1222 to show that a file is attached.

When a message is selected by a user, the content of this message is displayed in the message content display area 1250. If a file is attached to the message, it is displayed in the attached file display area 1260. For example, if the message 1222 is selected, the content of the message 1222 is displayed in the message content display area 1250, and a file 1265, which is a drawing corresponding to the document icon 1240, is displayed in the attached file display area 1260.

Figure 13:
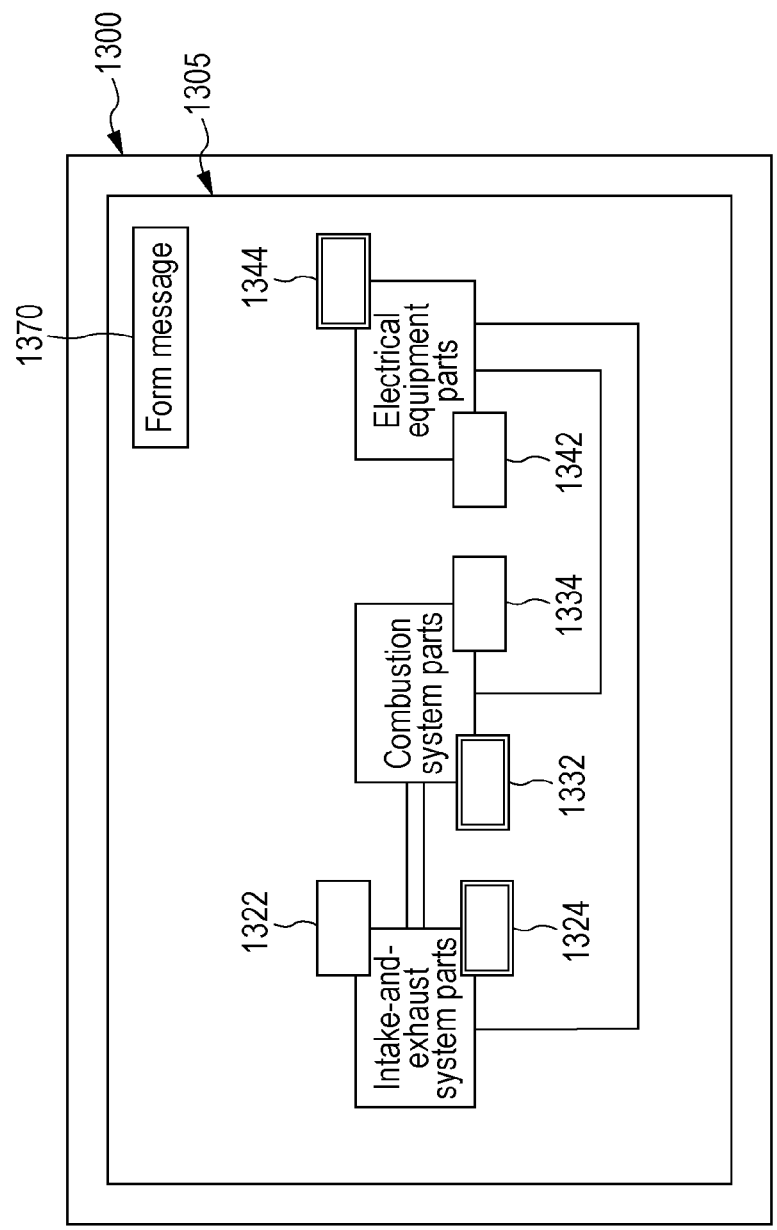
FIG. 13 illustrates an example of a screen displayed under the control of a sticky-note processing device.

FIG. 13 illustrates an example of a screen 1300 displayed under the control of the sticky-note processing device 150. In this example, the message 1222 shown in FIG. 12 is received from the message processing device 100, and then, sticky notes are added to a board 1305 on the screen 1300.

On the screen 1300, the board 1305 is displayed. The board 1305 is the file 1265 in the example of FIG. 12. That is, the message 1222 is sent from the message processing device 100, and the file 1265 attached to the message 1222 is received and is displayed on the screen 1300 as the board 1305.

Sticky notes 1322, 1324, 1332, 1334, 1342, and 1344 are added to the board 1305, and a message forming button 1370 is displayed on the board 1305. The sticky note 1322 may be a sticky note corresponding to the message 1222 or a child message thereof, or may be a new sticky note generated in the sticky-note processing device 150.

After a user has selected one of the sticky notes 1322, 1324, 1332, 1334, 1342, and 1344 and pressed the message forming button 1370, the selected sticky note is converted into a message and the message is sent to the message processing device 100.

Figure 14:
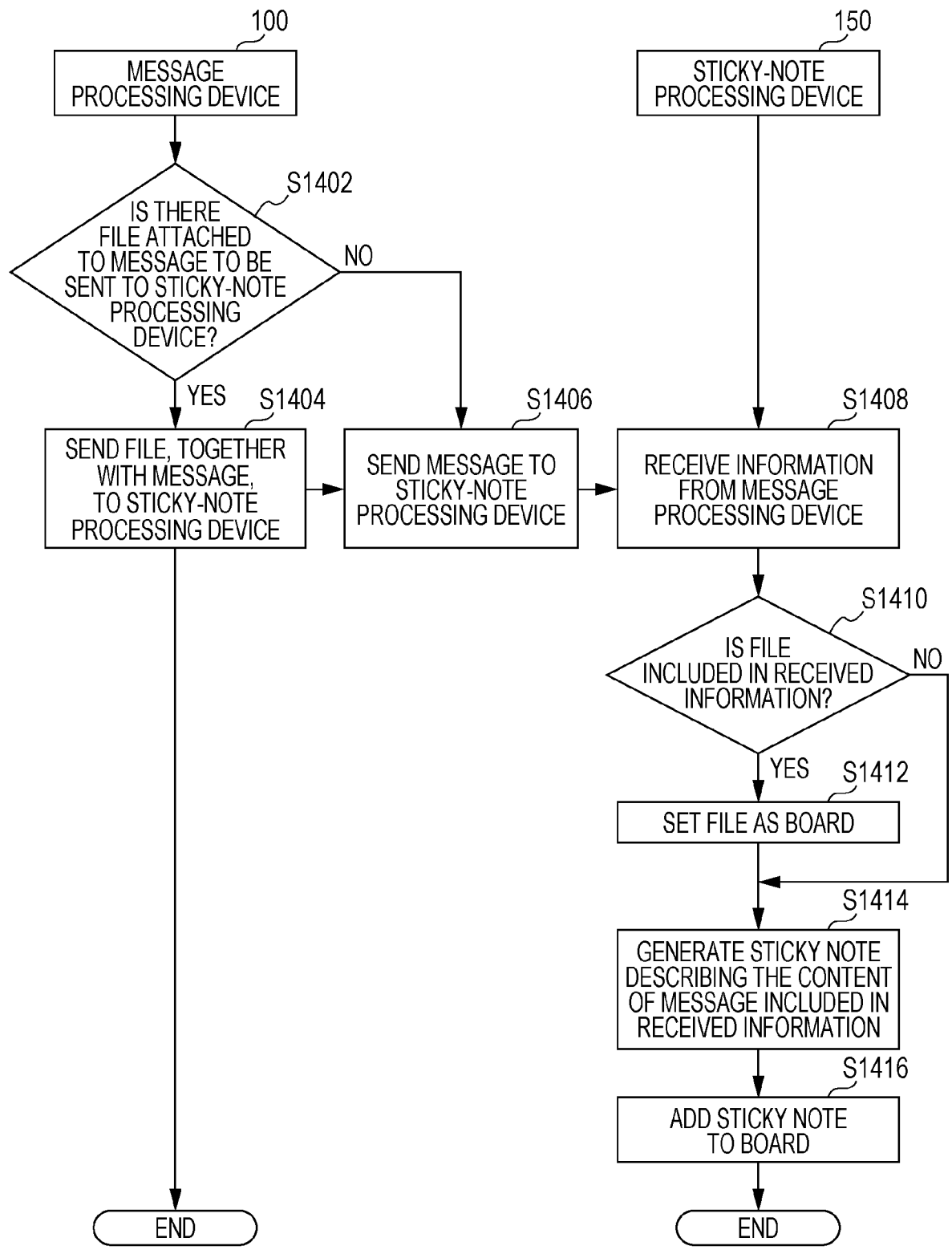
FIG. 14 is a flowchart illustrating an example of processing executed in the exemplary embodiment.

FIG. 14 is a flowchart illustrating an example of processing executed in the exemplary embodiment. More specifically, FIG. 14 illustrates an example of processing executed when a parent message is sent from the message processing device 100 to the sticky-note processing device 150.

In step S1402, the message processing device 100 judges whether a file is attached to a message to be sent to the sticky-note processing device 150. If a file is attached, the message processing device 100 proceeds to step S1404. If no file is attached, the message processing device 100 proceeds to step S1406.

In step S1404, the message processing device 100 sends the file, together with the message, to the sticky-note processing device 150.

In step S1406, the message processing device 100 sends the message to the sticky-note processing device 150.

In step S1408, after step S1404 or S1406, the sticky-note processing device 150 receives information from the message processing device 100.

The sticky-note processing device 150 judges in step S1410 whether the received information includes a file. If a file is included, the sticky-note processing device 150 proceeds to step S1412. If no file is included, the sticky-note processing device 150 proceeds to step S1414.

In step S1412, the sticky-note processing device 150 sets the file as a board.

In step S1414, the sticky-note processing device 150 generates a sticky note describing the content of the message included in the received information.

In step S1416, the sticky-note processing device 150 adds the generated sticky note to the board.

The processing in FIG. 14 may be executed at a timing at which a user of the message processing device 100 has selected a message to be sent to the sticky-note processing device 150 or a user of the sticky-note processing device 150 has made a request for a message in the message processing device 100.

Figure 15:
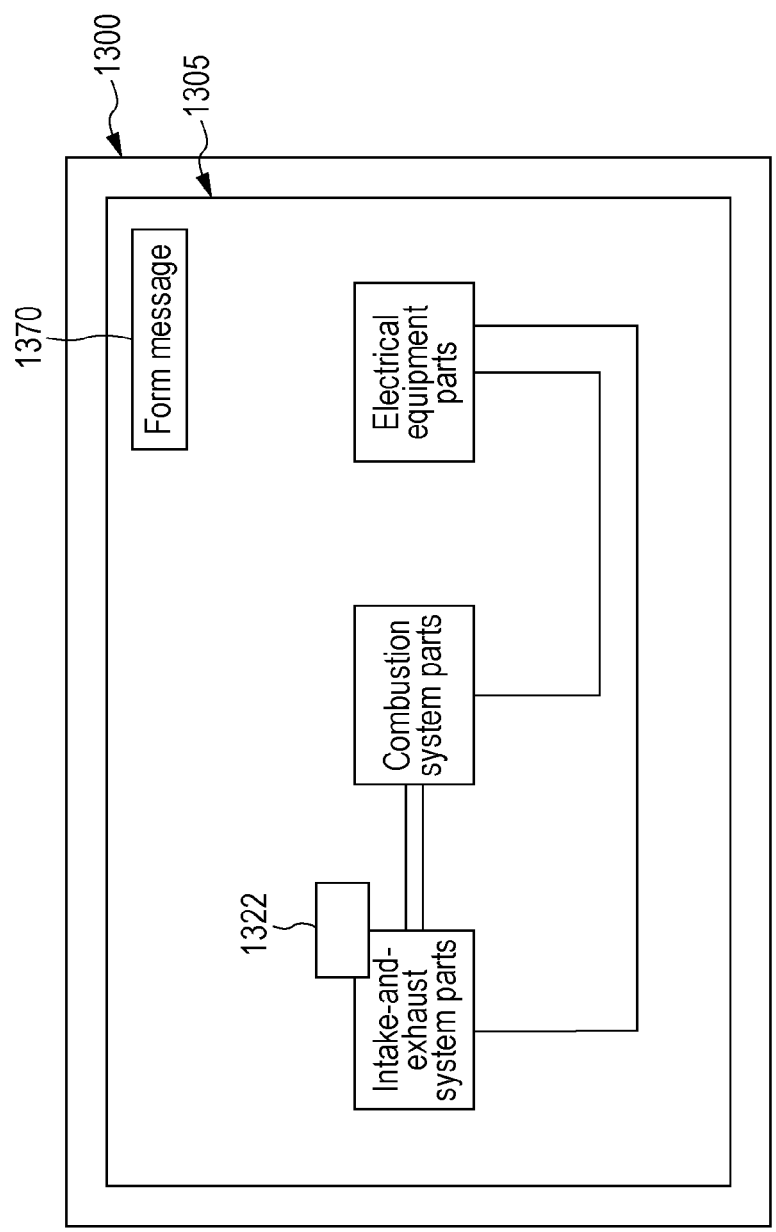
FIG. 15 illustrates an example of processing executed in the exemplary embodiment.

FIG. 15 illustrates an example of processing executed in the exemplary embodiment, that is, an example of the result obtained by executing the processing of the flowchart in FIG. 14. More specifically, FIG. 15 illustrates an example of a screen to be displayed when a message with an attached file is sent from the message processing device 100 to the sticky-note processing device 150.

On the screen 1300, the board 1305, which is the file attached to the message, is displayed.

The sticky note 1322 describing the content of the message is added to the board 1305. The message forming button 1370 is displayed on the board 1305.

Figure 16:
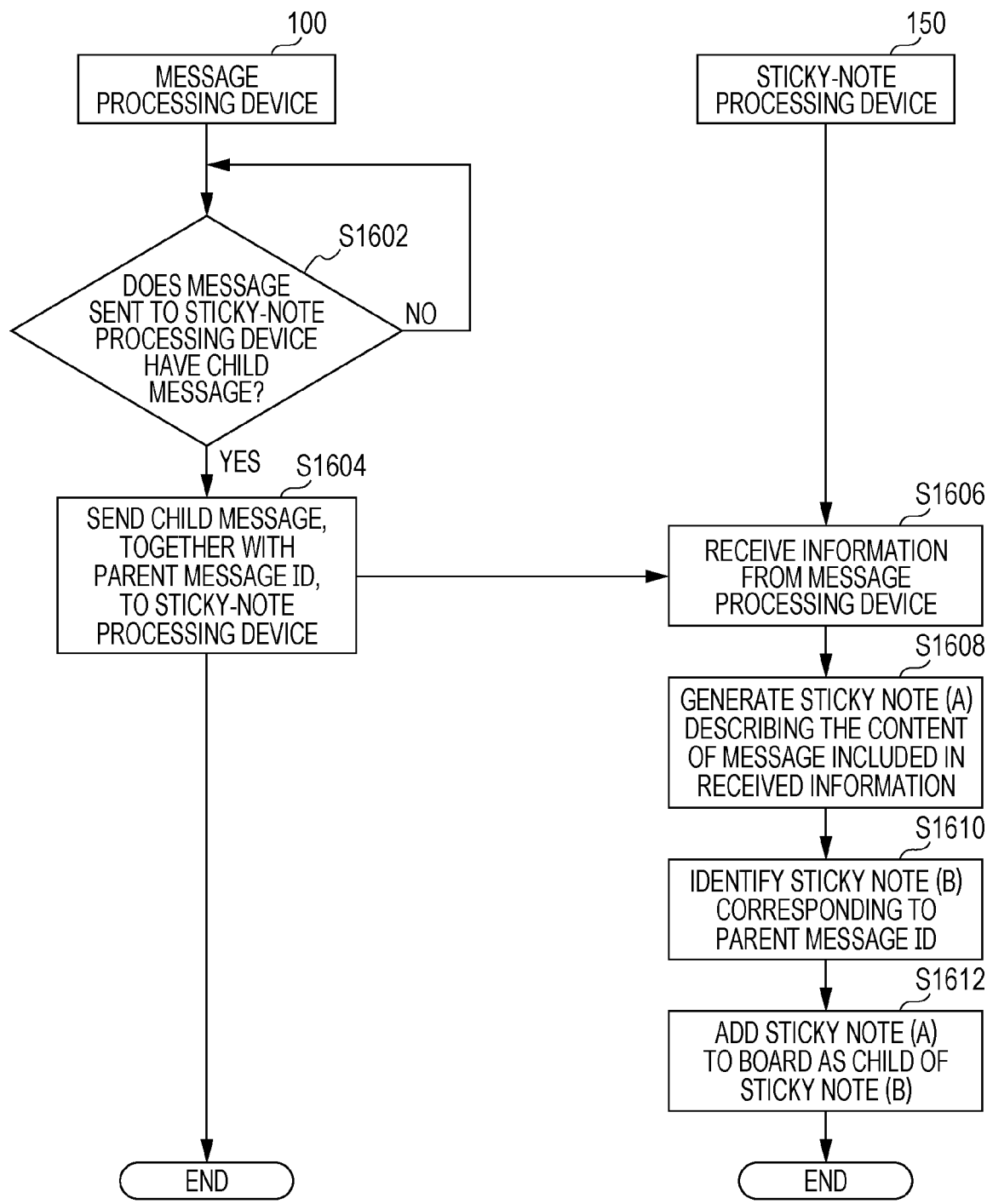
FIG. 16 is a flowchart illustrating an example of processing executed in the exemplary embodiment.

FIG. 16 is a flowchart illustrating an example of processing executed in the exemplary embodiment. More specifically, FIG. 16 illustrates an example of processing executed when a child message is sent from the message processing device 100 to the sticky-note processing device 150 after a parent message has been sent.

In step S1602, the message processing device 100 judges whether a message sent to the sticky-note processing device 150 has a child message. If the parent message has a child message, the message processing device 100 proceeds to step S1604. If the parent message has no child message, the message processing device 100 waits until a message having a child message is sent. Judging processing in step S1602 may be executed: after a parent message is sent; every time a message is generated; at predetermined regular intervals; when a user of the message processing device 100 has performed a sending operation; or when a request to send a message is received from the sticky-note processing device 150.

In step S1604, the message processing device 100 sends the child message to the sticky-note processing device 150, together with a parent message ID, which is information for identifying the parent message of this child message.

In step S1606, after step S1604, the sticky-note processing device 150 receives information from the message processing device 100.

In step S1608, the sticky-note processing device 150 generates a sticky note (A) describing the content of the message included in the received information.

In step S1610, the sticky-note processing device 150 identifies a sticky note (B) corresponding to the parent message ID.

In step S1612, the sticky-note processing device 150 adds the sticky note (A) to the board as a child of the sticky note (B).

Figure 17:
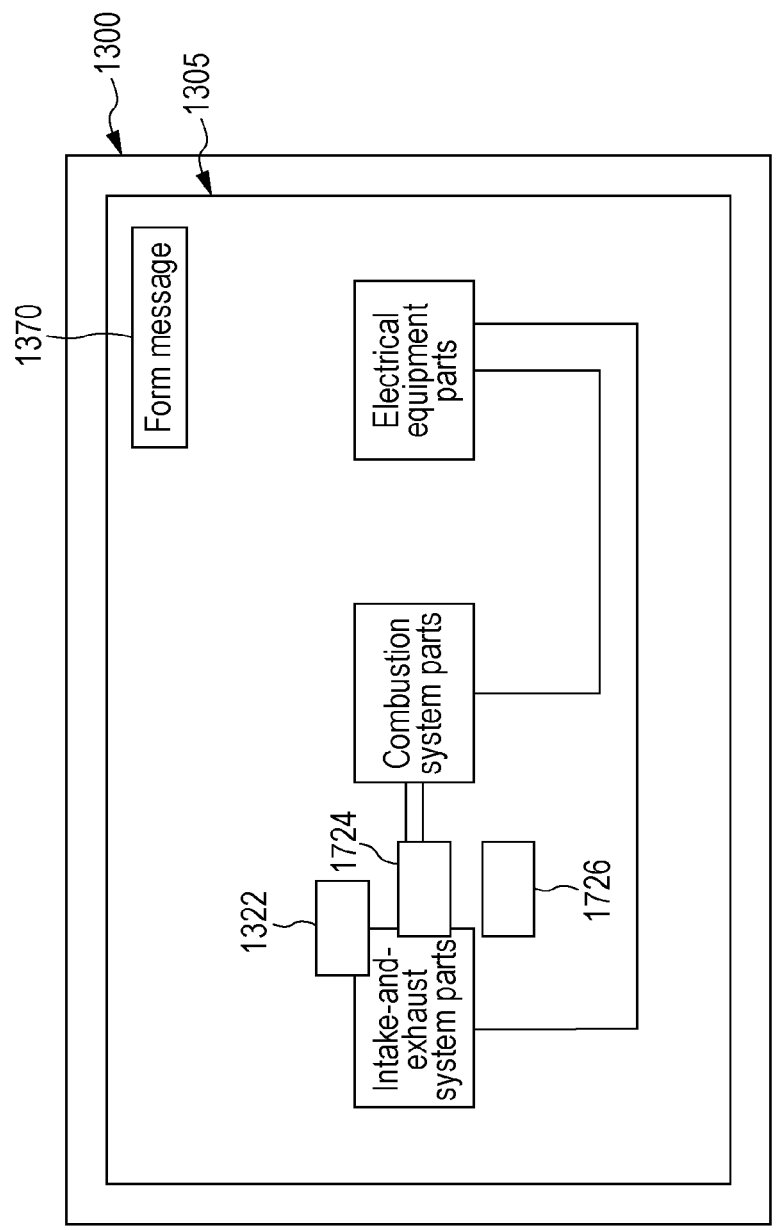
FIG. 17 illustrates an example of processing executed in the exemplary embodiment.

FIG. 17 illustrates an example of processing executed in the exemplary embodiment, that is, an example of the result obtained by executing the processing of the flowchart in FIG. 16. More specifically, FIG. 17 illustrates an example of a screen to be displayed when two child messages are sent from the message processing device 100 to the sticky-note processing device 150.

On the screen 1300, the board 1305 is displayed.

The sticky note 1322 and sticky notes 1724 and 1726 are added to the board 1305. The message button 1370 is also displayed on the board 1305. The sticky notes 1724 and 1726 have been created in association with the messages 1224 and 1230, which are newly received child messages of the message 1222. The sticky notes 1724 and 1726 may be added to the board 1305 at positions at which they can be identified as child sticky notes of the sticky note 1322.

Figure 18:
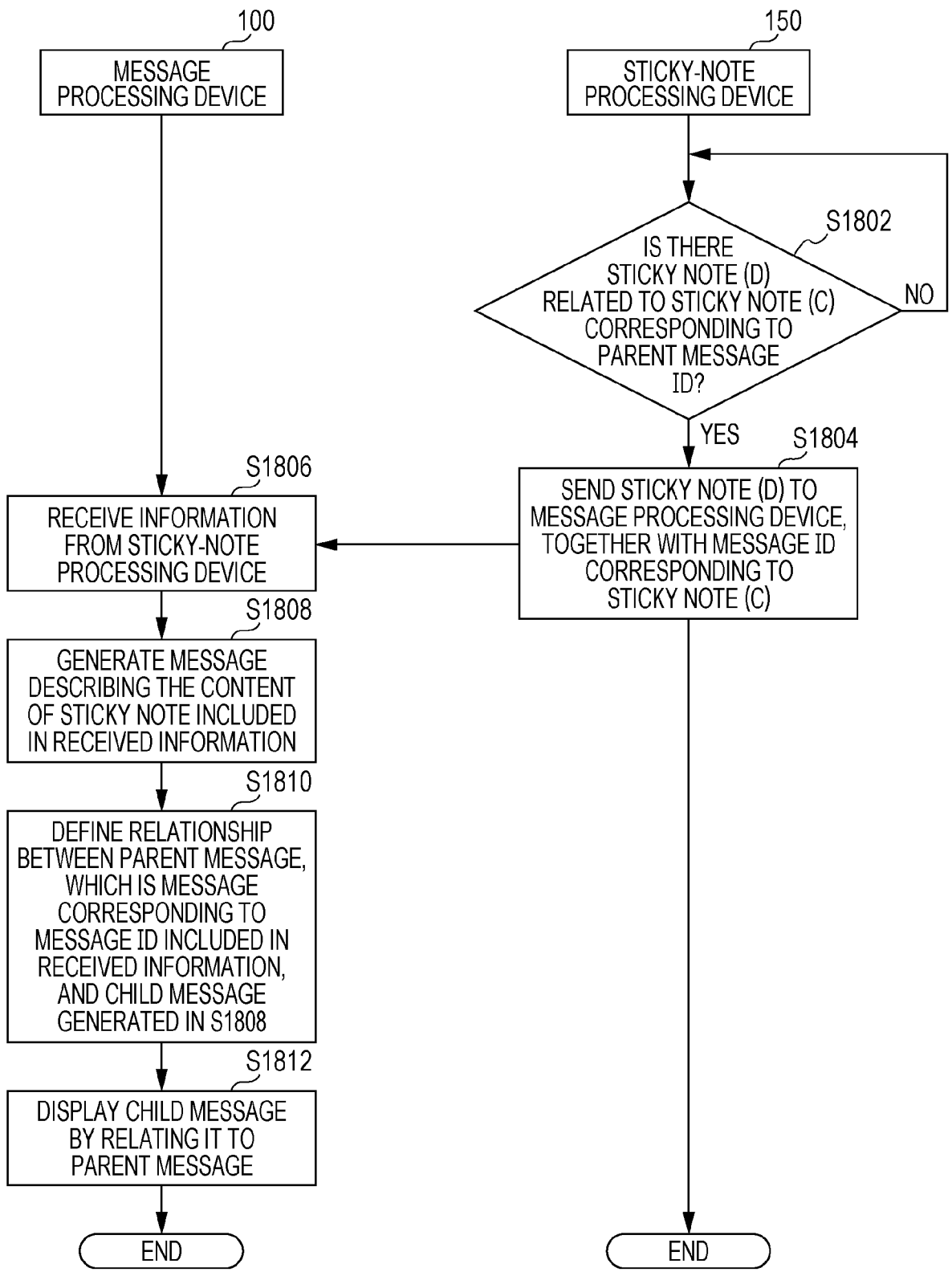
FIG. 18 is a flowchart illustrating an example of processing executed in the exemplary embodiment.

FIG. 18 is a flowchart illustrating an example of processing executed in the exemplary embodiment. More specifically, FIG. 18 illustrates an example of processing executed when a message associated with a sticky note is sent from the sticky-note processing device 150 to the message processing device 100.

In step S1802, the sticky-note processing device 150 judges whether a sticky note (C) corresponding to a parent message ID has a related sticky note (D). If the sticky note (C) has a related sticky note (D), the sticky-note processing device 150 proceeds to step S1804. If the sticky note (D) is not found, the sticky-note processing device 150 waits until such a related sticky note (D) is found. Judging processing in step S1802 may be executed: every time a message is generated; at predetermined regular intervals; when a user of the sticky-note processing device 150 has performed a sending operation; or when a request to send a message is received from the message processing device 100. A sticky note associated with a parent message will also be called a parent sticky note.

A sticky note related to a parent sticky note may be: all sticky notes added to a board; sticky notes positioned within a predetermined distance from a parent sticky note; sticky notes linked to a parent sticky note with connecting lines; or sticky notes belonging to the same group as a parent sticky note.

In step S1804, the sticky-note processing device 150 sends the sticky note (D) to the message processing device 100, together with a message ID, which is information for identifying the message associated with the sticky note (C).

In step S1806, after step S1804, the message processing device 100 receives information from the sticky-note processing device 150.

In step S1808, the message processing device 100 generates a message describing the content of a sticky note included in the received information.

In step S1810, the message processing device 100 defines a relationship between a parent message, which is the message corresponding to the message ID included in the received information, and a child message, which is the message generated in step S1808.

In step S1812, the message processing device 100 displays the child message by relating it with the parent message.

Figure 19:
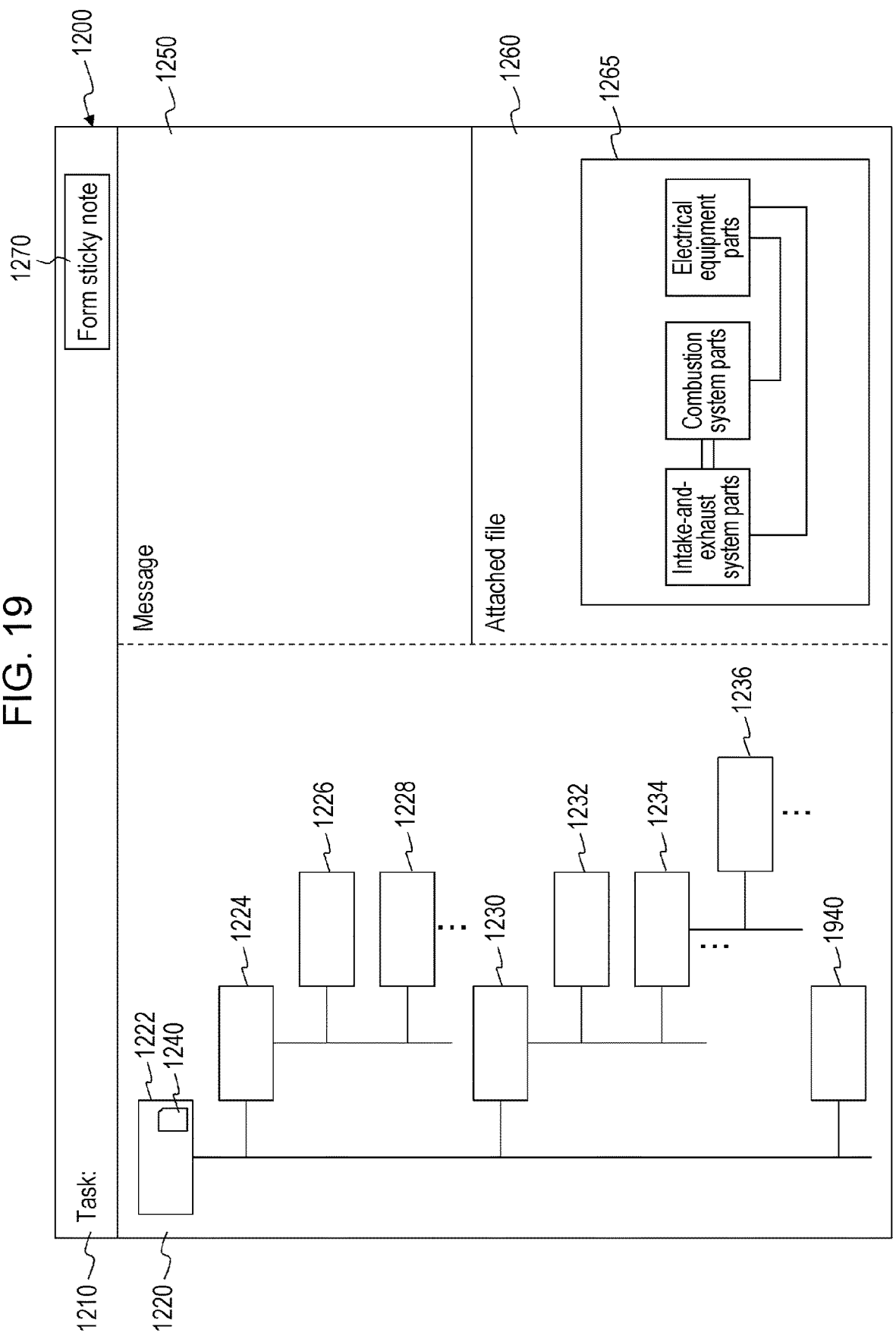
FIG. 19 illustrates an example of processing executed in the exemplary embodiment.

FIG. 19 illustrates an example of processing executed in the exemplary embodiment, that is, an example of the result obtained by executing the processing of the flowchart in FIG. 18. More specifically, FIG. 19 illustrates an example of a screen to be displayed when a sticky note is sent from the sticky-note processing device 150 to the message processing device 100.

The screen shown in FIG. 19 is a screen changed from that in FIG. 12 after a sticky note, which will be a child message of the message 1222, has been received from the sticky-note processing device 150.

That is, as well as the messages 1224 and 1230, a new message 1940, is added as a child message of the message 1222.

In the example in FIG. 16, a child message only immediately under a parent message is sent from the message processing device 100 to the sticky-note processing device 150. Alternatively, processing examples shown in FIGS. 20 through 24 may be executed. More specifically, step S1604 of the flowchart in FIG. 16 may be replaced by processing examples in FIGS. 20 through 24.

Figure 20:
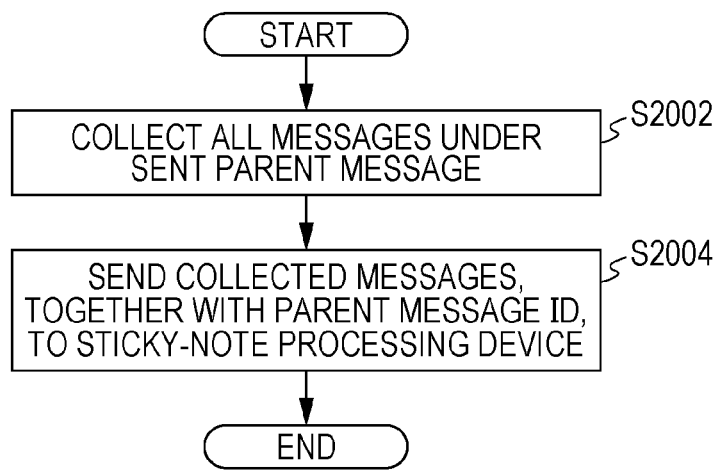
FIG. 20 is a flowchart illustrating an example of processing executed in the exemplary embodiment.

FIG. 20 is a flowchart illustrating an example of processing executed in the exemplary embodiment. More specifically, FIG. 20 illustrates an example of processing executed by the message processing device 100 when sending a message to the sticky-note processing device 150.

In step S2002, the message processing device 100 collects all the messages under a sent parent message.

In step S2004, the message processing device 100 sends the collected messages, together with the parent message ID, to the sticky-note processing device 150.

In this example of processing, not only a child message immediately under the parent message, but also a message under this child message, that is, a descendant message, is also sent from the message processing device 100 to the sticky-note processing device 150.

Figure 21:
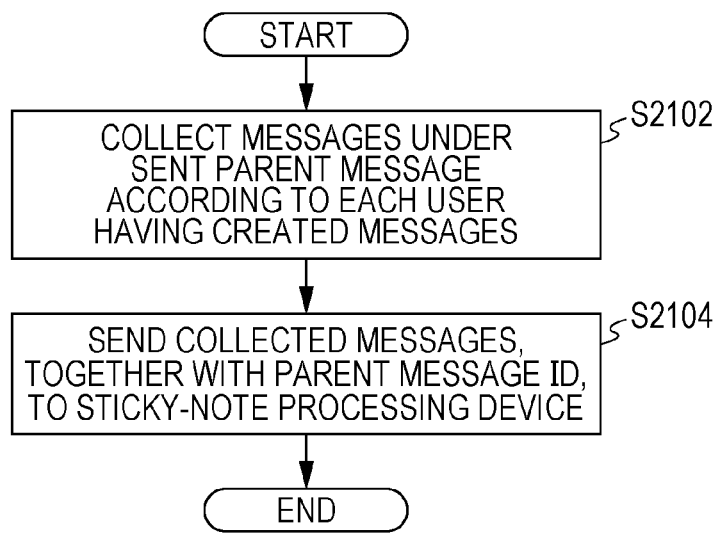
FIG. 21 is a flowchart illustrating an example of processing executed in the exemplary embodiment.

FIG. 21 is a flowchart illustrating an example of processing executed in the exemplary embodiment. More specifically, FIG. 21 illustrates an example of processing executed by the message processing device 100 when sending a message to the sticky-note processing device 150.

In step S2102, the message processing device 100 collects messages under a sent parent message according to each user having created the messages.

In step S2104, the message processing device 100 sends the collected messages, together with the parent message ID, to the sticky-note processing device 150.

In this example of processing, messages are sent from the message processing device 100 to the sticky-note processing device 150 according to each message creator. Alternatively, as in the examples in FIGS. 22A and 22B, messages only created by a predetermined creator may be sent.

Figure 22A:
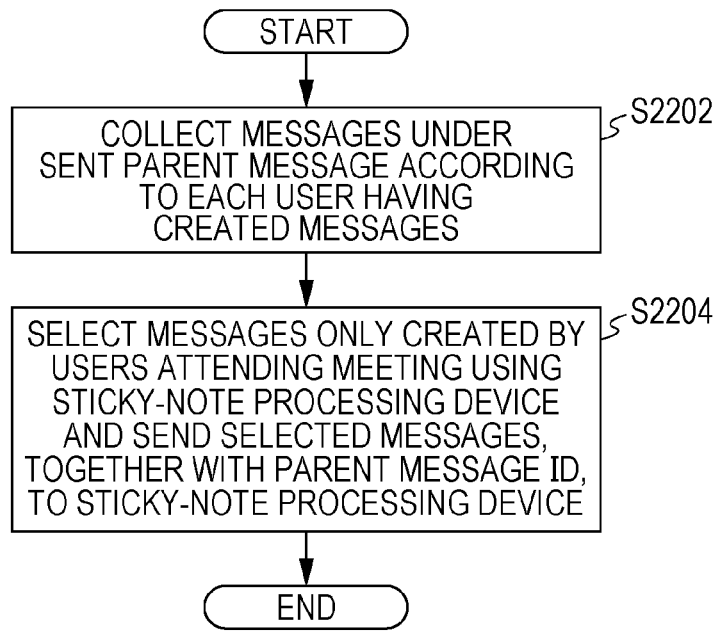
FIGS. 22A and 22B are flowcharts illustrating examples of processing executed in the exemplary embodiment.
Figure 22B:
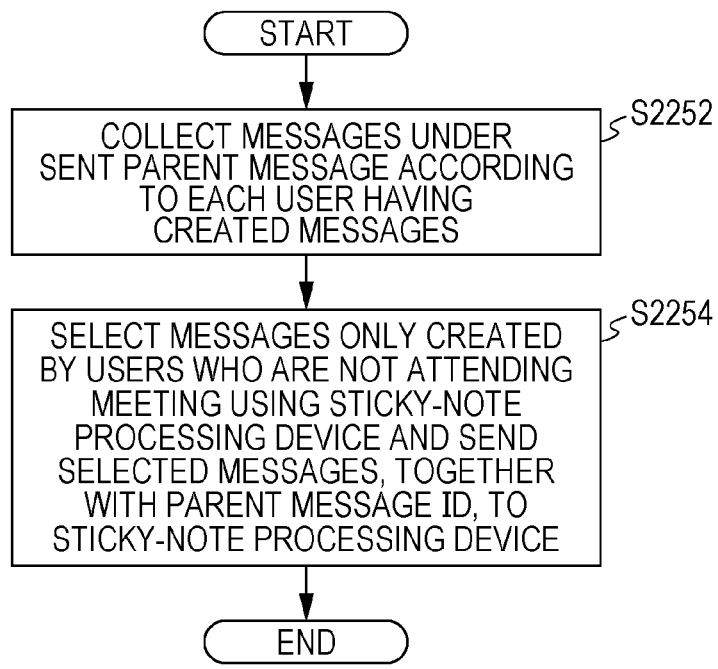

FIGS. 22A and 22B are flowcharts illustrating examples of processing executed in the exemplary embodiment. More specifically, FIGS. 22A and 22B illustrate examples of processing executed by the message processing device 100 when sending a message to the sticky-note processing device 150.

In step S2202 in FIG. 22A, the message processing device 100 collects messages under a sent parent message according to each user having created the messages.

In step S2204, the message processing device 100 selects messages only created by users attending a meeting conducted by using the sticky-note processing device 150, and sends the selected messages, together with the parent message ID, to the sticky-note processing device 150.

In this example of processing, messages only created by users attending a meeting conducted by using the sticky-note processing device 150 are sent from the message processing device 100 to the sticky-note processing device 150. This can save the users attending the meeting the trouble of describing their comments made by using the message processing device 100 on sticky notes.

In step S2252 in FIG. 22B, the message processing device 100 collects messages under a sent parent message according to each user having created the messages.

In step S2254, the message processing device 100 selects messages only created by users who are not attending a meeting conducted by using the sticky-note processing device 150, and sends the selected messages, together with the parent message ID, to the sticky-note processing device 150.

In this example of processing, messages only created by users who are not attending a meeting conducted by using the sticky-note processing device 150 are sent from the message processing device 100 to the sticky-note processing device 150. This allows users attending the meeting to read comments made by the users who are not attending the meeting.

Figure 23:
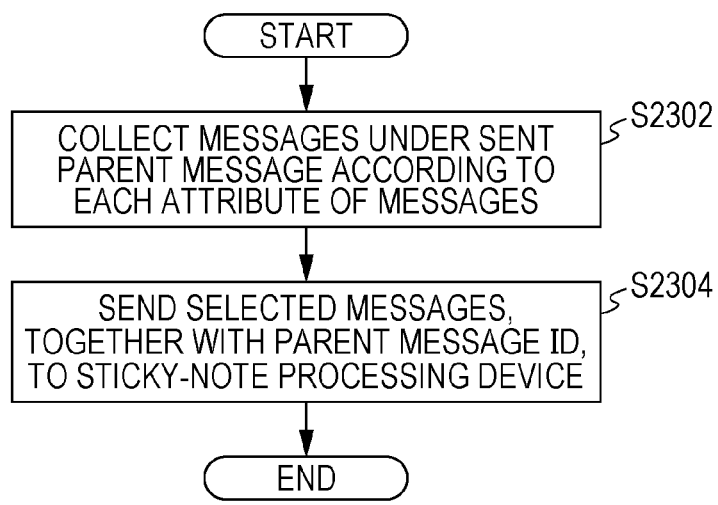
FIG. 23 is a flowchart illustrating an example of processing executed in the exemplary embodiment.

FIG. 23 is a flowchart illustrating an example of processing executed in the exemplary embodiment. More specifically, FIG. 23 illustrates an example of processing executed by the message processing device 100 when sending a message to the sticky-note processing device 150.

In step S2302, the message processing device 100 collects messages under a sent parent message according to each of the attributes of the messages. The message processing device 100 may alternatively collect messages having a predetermined attribute.

In step S2304, the message processing device 100 sends the collected messages, together with the parent message ID, to the sticky-note processing device 150.

In this example of processing, messages are sent from the message processing device 100 to the sticky-note processing device 150 according to each of the attributes of the messages, or messages having a predetermined attribute are sent. For example, only messages displayed in red are sent to the sticky-note processing device 150.

Figure 24:
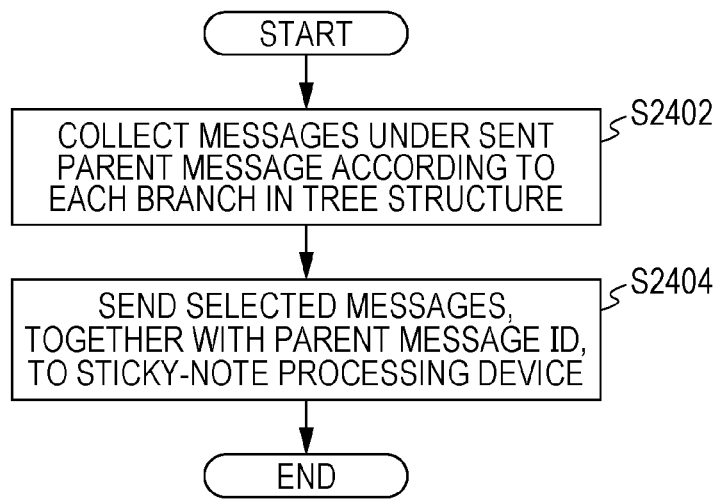
FIG. 24 is a flowchart illustrating an example of processing executed in the exemplary embodiment.

FIG. 24 is a flowchart illustrating an example of processing executed in the exemplary embodiment. More specifically, FIG. 24 illustrates an example of processing executed by the message processing device 100 when sending a message to the sticky-note processing device 150.

In step S2402, the message processing device 100 collects messages under a sent parent message according to each of the branches in a tree structure of the messages.

In step S2404, the message processing device 100 sends the collected messages, together with the parent message ID, to the sticky-note processing device 150.

In this example of processing, messages are sent from the message processing device 100 to the sticky-note processing device 150 according to each of the branches in a tree structure of the messages. This will be explained in detail with reference to FIG. 25.

Figure 25:
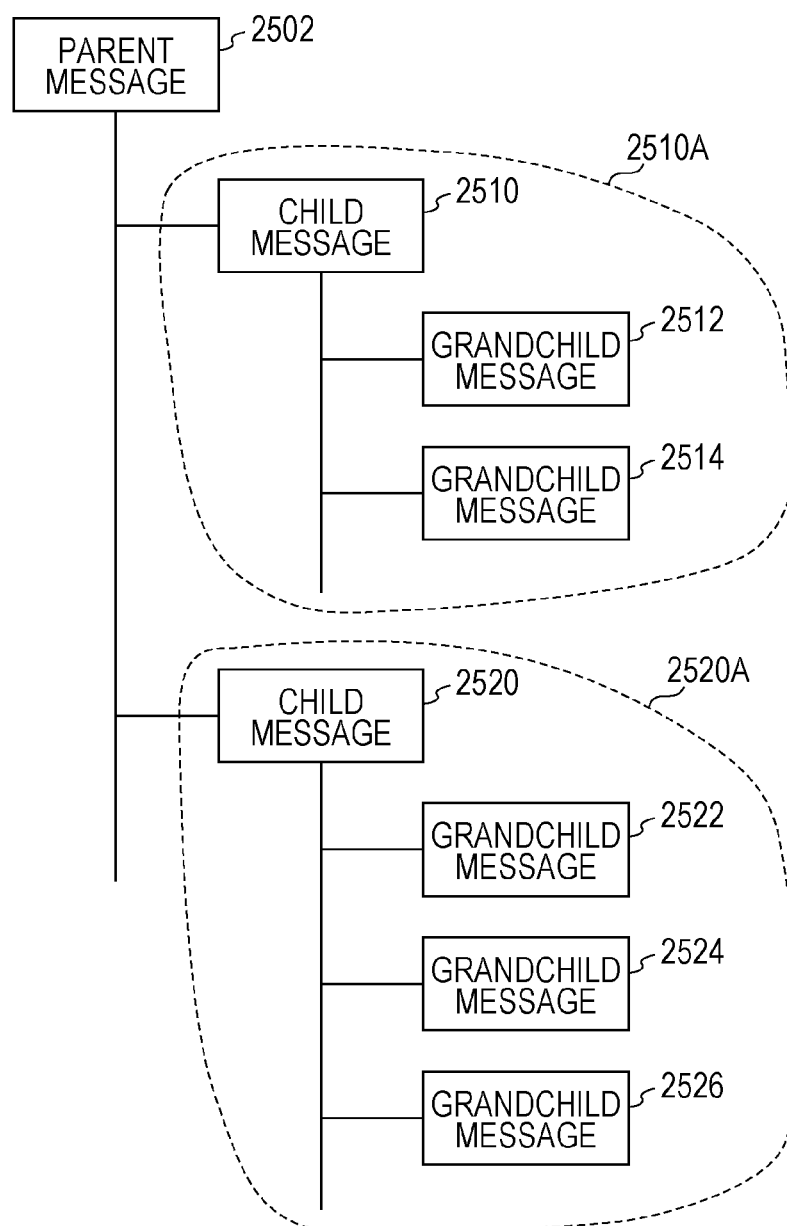
FIG. 25 illustrates an example of processing executed in the exemplary embodiment.

FIG. 25 illustrates an example of processing executed in the exemplary embodiment.

Immediately under a parent message 2502, child messages 2510 and 2520 are placed. In this case, the message processing device 100 sends two groups of messages, that is, a group of message in a branch 2510A and another group of messages in a branch 2520A, to the sticky-note processing device 150. The branch 2510A includes a child message 2510 and grandchild messages 2512 and 2514. The branch 2520A includes a child message 2520 and grandchild messages 2522, 2524, and 2526. If another message (descendant message) is placed under a grandchild message, it is also included in a corresponding branch.

The sticky-note processing device 150 may display sticky notes generated from the messages within the branch 2510A and those within the branch 2520A in a different manner. For example, the sticky notes generated from the messages within the branch 2510A may be displayed in red, while those generated from the messages within the branch 2520A may be displayed in blue.

The example in FIG. 18 shows processing executed by the sticky-note processing device 150 as a result of the message processing device 100 having sent a child message only immediately under a parent message to the sticky-note processing device 150. Alternatively, processing examples shown in FIGS. 26 through 30 may be executed. More specifically, step S1804 of the flowchart in FIG. 18 may be replaced by processing examples in FIGS. 26 through 30.

Figure 26:
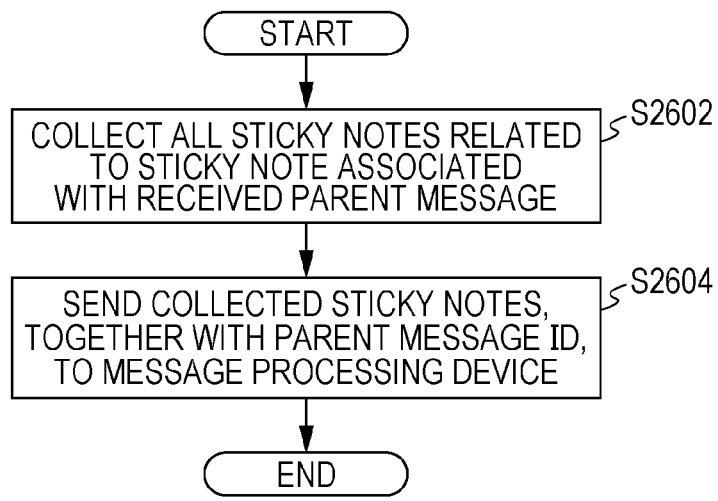
FIG. 26 is a flowchart illustrating an example of processing executed in the exemplary embodiment.

FIG. 26 is a flowchart illustrating an example of processing executed in the exemplary embodiment. More specifically, FIG. 26 illustrates an example of processing executed by the sticky-note processing device 150 when sending a sticky note to the message processing device 100. Sticky notes to be sent from the sticky-note processing device 150 to the message processing device 100 may be restricted to new sticky notes generated in the sticky-note processing device 150. That is, sticky notes associated with messages sent from the message processing device 100 may be excluded.

In step S2602, the sticky-note processing device 150 collects all sticky notes related to a sticky note associated with a received parent message.

In step S2604, the sticky-note processing device 150 sends the collected sticky notes, together with the parent message ID, to the message processing device 100. This enables the message processing device 100 to place the messages associated with the received sticky notes under the message having the parent message ID.

Figure 27:
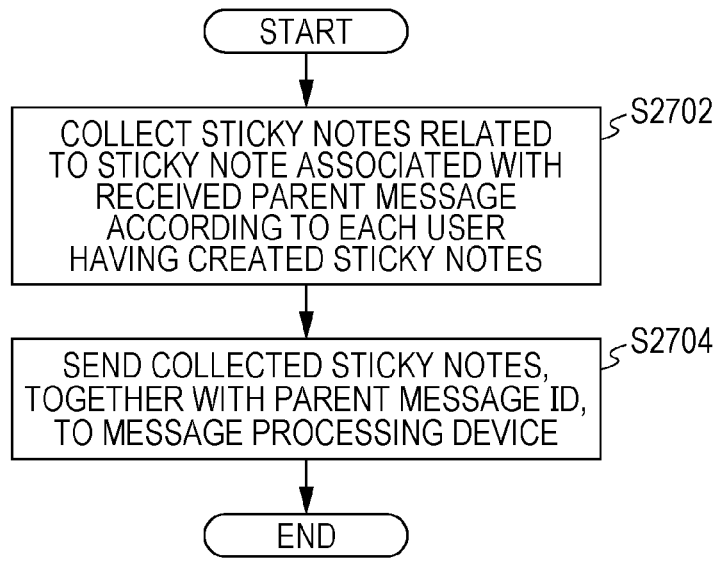
FIG. 27 is a flowchart illustrating an example of processing executed in the exemplary embodiment.

FIG. 27 is a flowchart illustrating an example of processing executed in the exemplary embodiment. More specifically, FIG. 27 illustrates an example of processing executed by the sticky-note processing device 150 when sending a sticky note to the message processing device 100.

In step S2702, the sticky-note processing device 150 collects sticky notes related to a sticky note associated with a received parent message according to each user having created the sticky notes.

In step S2704, the sticky-note processing device 150 sends the collected sticky notes, together with the parent message ID, to the message processing device 100.

In this example of processing, sticky notes are sent from the sticky-note processing device 150 to the message processing device 100 according to each creator of the sticky notes. Alternatively, as in the examples in FIGS. 28A and 28B, sticky notes only created by a predetermined creator may be sent.

Figure 28A:
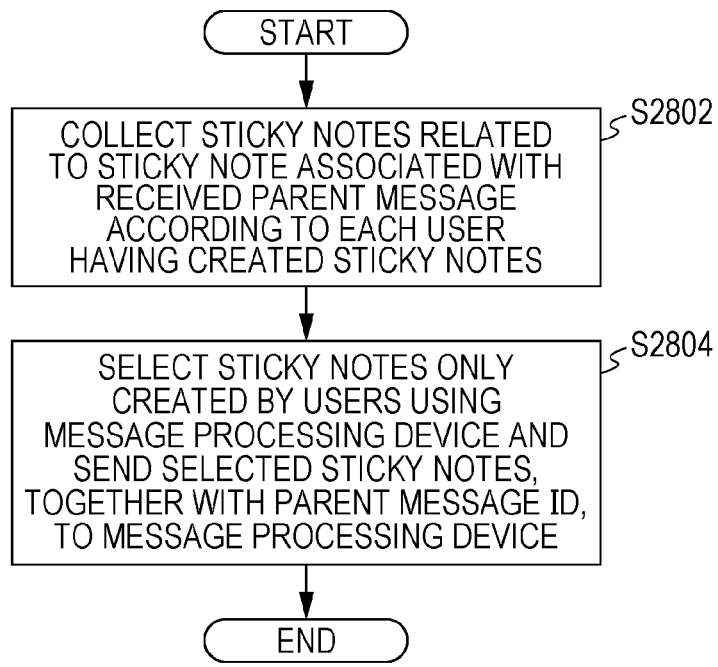
FIGS. 28A and 28B are flowcharts illustrating examples of processing executed in the exemplary embodiment.
Figure 28B:
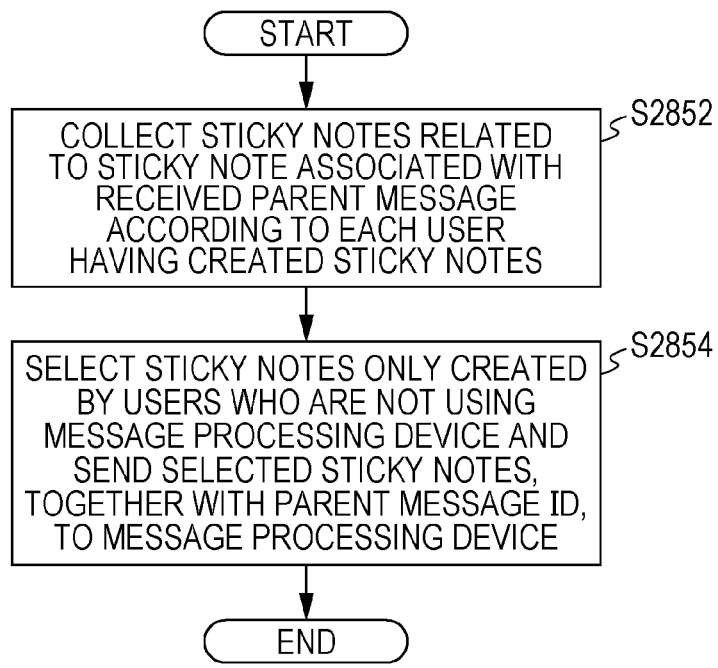

FIGS. 28A and 28B are flowcharts illustrating examples of processing executed in the exemplary embodiment. More specifically, FIGS. 28A and 28B illustrate examples of processing executed by the sticky-note processing device 150 when sending a sticky note to the message processing device 100.

In step S2802 in FIG. 28A, the sticky-note processing device 150 collects sticky notes related to a sticky note associated with a received parent message according to each user having created the sticky notes.

In step S2804, the sticky-note processing device 150 selects sticky notes only created by users using the message processing device 100, and sends the selected sticky notes, together with the parent message ID, to the message processing device 100.

In this example of processing, sticky notes only created by users using the message processing device 100 are sent from the sticky-note processing device 150 to the message processing device 100. This can save the users using the message processing device 100 the trouble of converting the sticky notes generated in the sticky-note processing device 150 into messages.

In step S2852 in FIG. 28B, the sticky-note processing device 150 collects sticky notes related to a sticky note associated with a received parent message according to each user having created the sticky notes.

In step S2854, the sticky-note processing device 150 selects sticky notes only created by users who are not using the message processing device 100, and sends the selected sticky notes, together with the parent message ID, to the message processing device 100.

In this example of processing, sticky notes only created by the users who are not using the message processing device 100 are sent from the sticky-note processing device 150 to the message processing device 100. This allows users using the message processing device 100 to read comments made by the users who are not using the message processing device 100. A user having created a message by using the message processing device 100 is a sender of this message. However, in the processing executed in FIG. 28B, a creator of a message may be the sticky-note processing device 150 or a user attending a meeting by using the sticky-note processing device 150.

Figure 29:
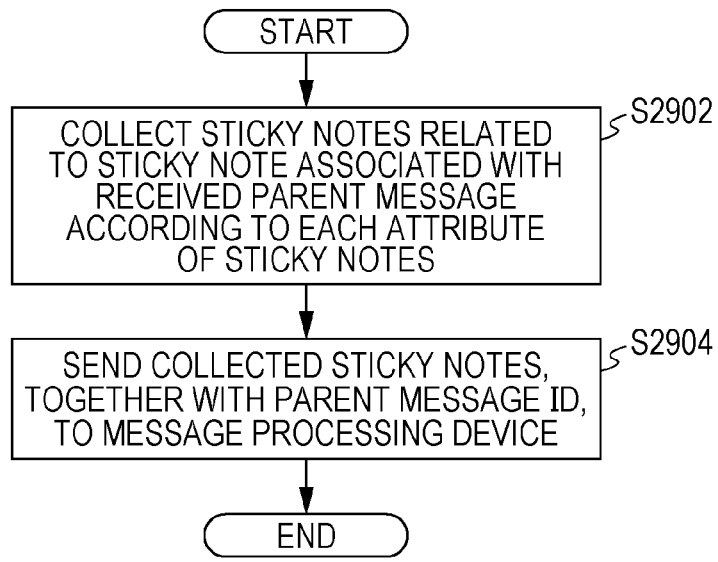
FIG. 29 is a flowchart illustrating an example of processing executed in the exemplary embodiment.

FIG. 29 is a flowchart illustrating an example of processing executed in the exemplary embodiment. More specifically, FIG. 29 illustrates an example of processing executed by the sticky-note processing device 150 when sending a sticky note to the message processing device 100.

In step S2902, the sticky-note processing device 150 collects sticky notes related to a sticky note associated with a received parent message according to each of the attributes of the sticky notes. The sticky-note processing device 150 may alternatively collect sticky notes having a predetermined attribute.

In step S2904, the sticky-note processing device 150 sends the collected sticky notes, together with the parent message ID, to the message processing device 100.

In this example of processing, sticky notes are sent from the sticky-note processing device 150 to the message processing device 100 according to each of the attributes of the sticky notes, or sticky notes having a predetermined attribute are sent. For example, only sticky notes displayed in red are sent to the message processing device 100.

Figure 30:
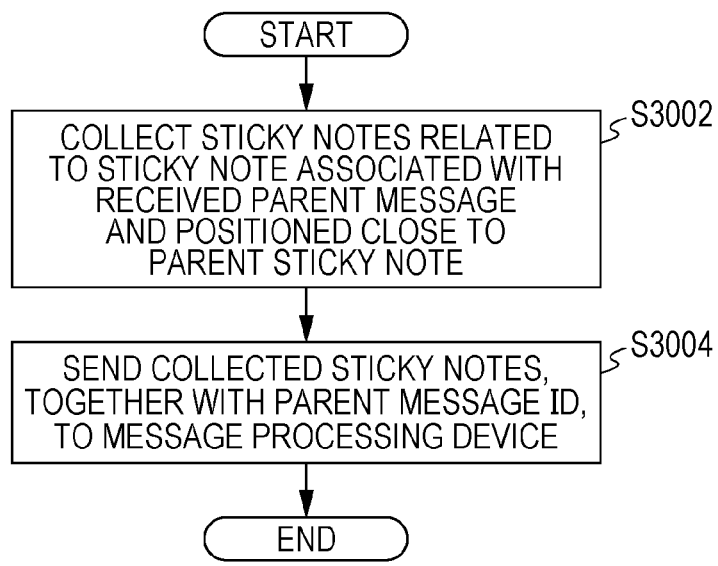
FIG. 30 is a flowchart illustrating an example of processing executed in the exemplary embodiment.

FIG. 30 is a flowchart illustrating an example of processing executed in the exemplary embodiment. More specifically, FIG. 30 illustrates an example of processing executed by the sticky-note processing device 150 when sending a sticky note to the message processing device 100.

In step S3002, the sticky-note processing device 150 collects sticky notes related to a sticky note associated with a received parent message and positioned close to the parent sticky note.

In step S3004, the sticky-note processing device 150 sends the collected sticky notes, together with the parent message ID, to the message processing device 100.

In this example of processing, sticky notes are sent from the sticky-note processing device 150 to the message processing device 100 according to the positional relationships among the sticky notes on a board. This will be explained in detail with reference to FIG. 31.

Figure 31:
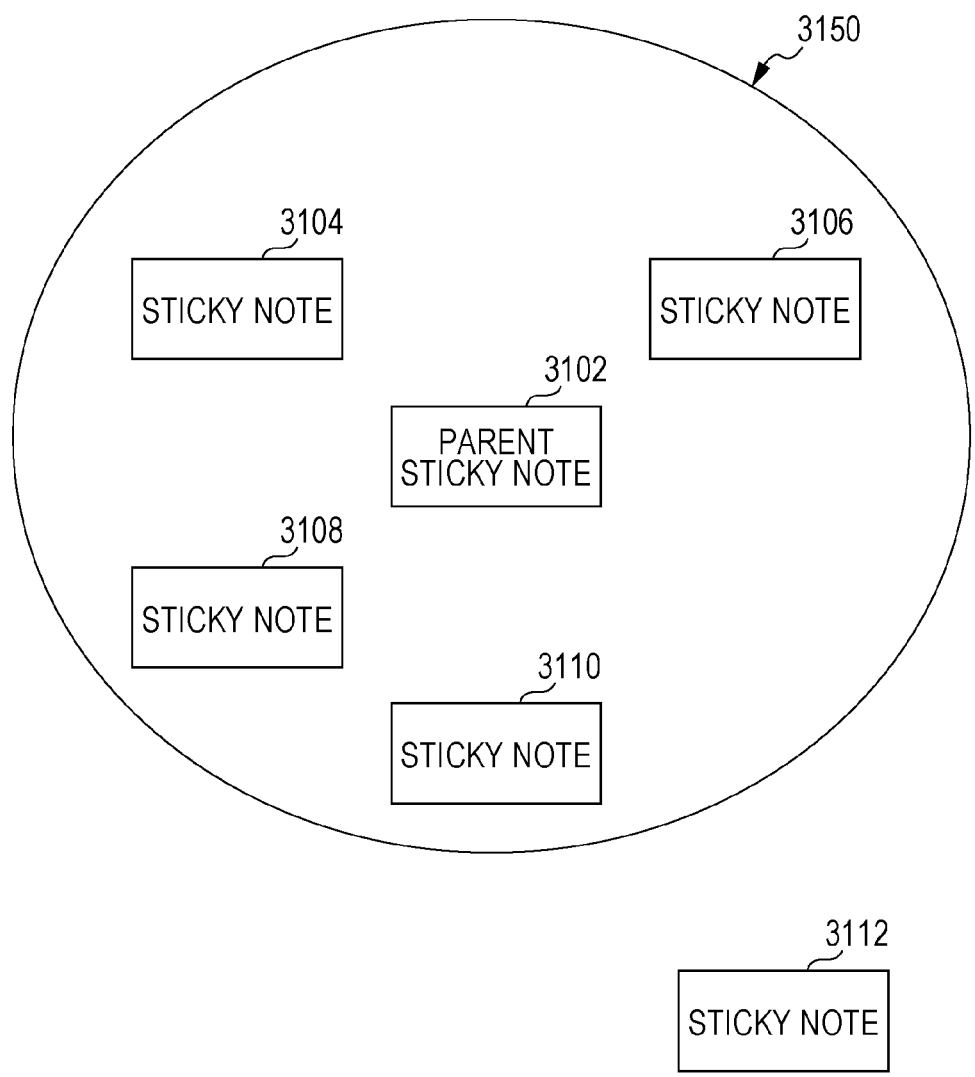
FIG. 31 illustrates an example of processing executed in the exemplary embodiment.

FIG. 31 illustrates an example of processing executed in the exemplary embodiment. Sticky notes positioned close to a parent sticky note are those positioned within a predetermined distance from the parent sticky note. For example, as shown in FIG. 31, sticky notes positioned close to a parent sticky note 3102 are those within a near distance region 3150, which is within a predetermined distance from the center of the parent sticky note 3102.

In the example in FIG. 31, the parent sticky note 3102 and sticky notes 3104, 3106, 3108, and 3110 are included in the near distance region 3150, but a sticky note 3112 is excluded. In this case, the parent sticky note 3102 and the sticky notes 3104, 3106, 3108, and 3110 are sticky notes positioned close to a parent sticky note and are sent to the message processing device 100. The sticky note 3112 is not sent.

Figure 32:
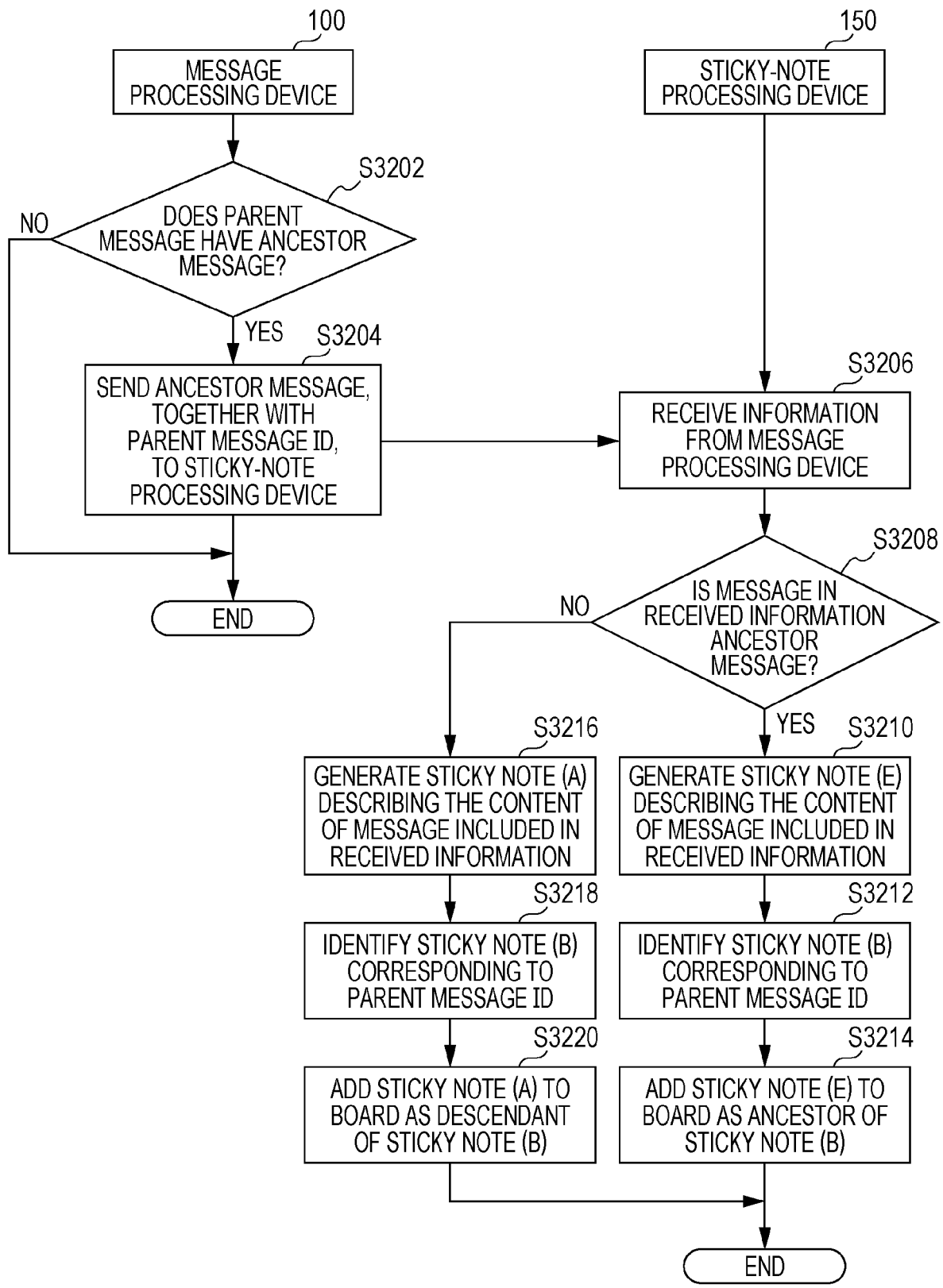
FIG. 32 is a flowchart illustrating an example of processing executed in the exemplary embodiment.

FIG. 32 is a flowchart illustrating an example of processing executed in the exemplary embodiment. It has been described that the message processing device 100 sends a parent message and its descendant messages to the sticky-note processing device 150. However, a parent message with an attached file, which serves as a board, may have its parent message (also called an ancestor message). This ancestor message may also be sent.

In step S3202, the message processing device 100 judges whether a parent message has an ancestor message. If the parent message has an ancestor message, the message processing device 100 proceeds to step S3204. If the parent message does not have any ancestor message, the processing is terminated.

In step S3204, the message processing device 100 sends the ancestor message, together with the parent message ID, to the sticky-note processing device 150.

In step S3206, after step S3204, the sticky-note processing device 150 receives information from the message processing device 100.

In step S3208, the sticky-note processing device 150 judges whether a message included in the received information is an ancestor message of a parent message. If the message is an ancestor message, the sticky-note processing device 150 proceeds to step S3210. If the message is not an ancestor message, the sticky-note processing device 150 proceeds to step S3216.

In step S3210, the sticky-note processing device 150 generates a sticky note (E) describing the content of the message included in the received information.

In step S3212, the sticky-note processing device 150 identifies a sticky note (B) corresponding to the parent message ID.

In step S3214, the sticky-note processing device 150 adds the sticky note (E) to the board as an ancestor of the sticky note (B).

In step S3216, the sticky-note processing device 150 generates a sticky note (A) describing the content of the message included in the received information.

In step S3218, the sticky-note processing device 150 identifies the sticky note (B) corresponding to the parent message ID.

In step S3220, the sticky-note processing device 150 adds the sticky note (A) to the board as a descendant of the sticky note (B).

Figure 33:
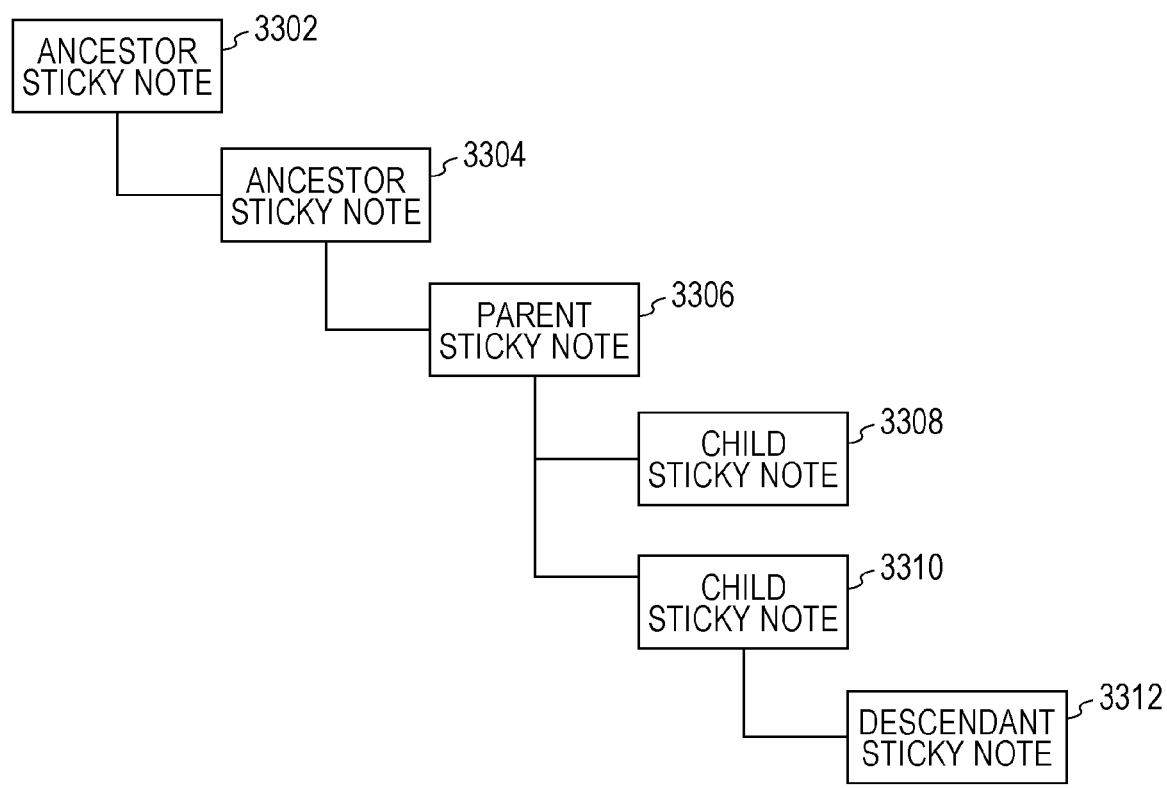
FIG. 33 illustrates an example of processing executed in the exemplary embodiment.

FIG. 33 illustrates an example of processing executed in the exemplary embodiment. More specifically, FIG. 33 illustrates an example of the structure of messages.

Immediately under an ancestor sticky note 3302, an ancestor sticky note 3304 is placed. Immediately under the ancestor sticky note 3304, a parent sticky note 3306 is placed. Immediately under the parent sticky note 3306, child sticky notes 3308 and 3310 are placed. Immediately under the child sticky note 3310, a descendant sticky note 3312 is placed.

If the parent sticky note 3306 is associated with a message with an attached file, which serves as a board, the child sticky notes 3308 and 3310 and the descendant sticky note 3312 correspond to descendant messages, and the ancestor sticky notes 3304 and 3302 correspond to ancestor messages.

Examples of the ancestor message sent to the sticky-note processing device 150 in step S3204 of the flowchart in FIG. 32 are ancestor messages corresponding to the ancestor sticky notes 3304 and 3302.

FIGS. 34A and 34B illustrate an example of processing executed in the exemplary embodiment. More specifically, FIGS. 34A and 34B illustrate an example in which a link is described within a sticky note so that a message associated with this sticky note can be displayed.

It is now assumed that a web page of a message screen generated by the message processing device 100 is displayed in one tag of a web browser, while a web page of a sticky note screen generated by the sticky-note processing device 150 is displayed in another tag of the web browser.

A screen 3400 shown in FIG. 34A is a message screen. On the screen 3400, a task display area 3410, a message tree structure display area 3420, and a message content display area 3450 are displayed. In the message tree structure display area 3420, messages 3424 and 3426 are displayed as child messages of a message 3422. A sticky note 3454 shown in FIG. 34B is a sticky note added to a board, and a link is embedded in the sticky note 3454. The sticky note 3454 is associated with the message 3424. The message 3424 has been sent to the sticky-note processing device 150, and the sticky note 3454 has been generated in the sticky-note processing device 150.

When a user has selected the link within the sticky note 3454, the screen 3400 shown in FIG. 34A is displayed, and the message 3424 is displayed in a different display mode from the other messages. For example, the message 3424 is displayed with a red background or in a blinking mode.

Figure 35B:
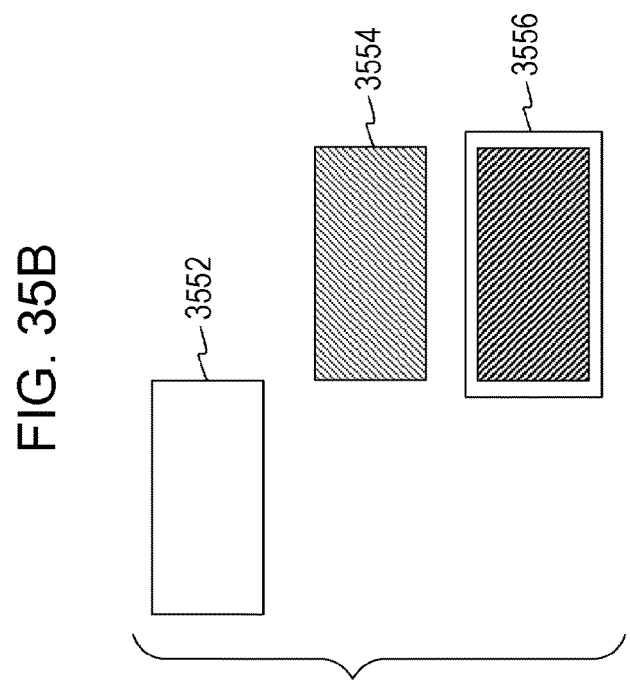
FIGS. 35A and 35B illustrate an example of processing executed in the exemplary embodiment.
Figure 35A:
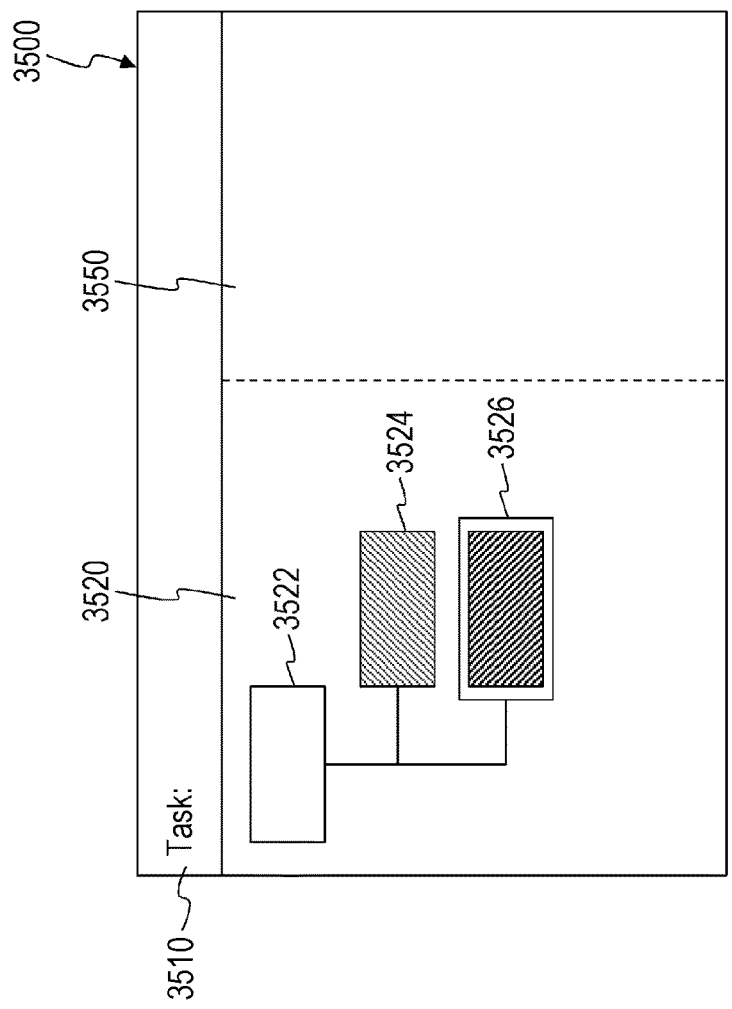

FIGS. 35A and 35B illustrate an example of processing executed in the exemplary embodiment. More specifically, FIGS. 35A and 35B illustrate an example in which the display attribute of a sticky note is changed to that of its associated message, or conversely, the display attribute of a message is changed to that of its associated sticky note.

A screen 3500 shown in FIG. 35A is a message screen. On the screen 3500, a task display area 3510, a message tree structure display area 3520, and a message content display area 3550 are displayed. In the message tree structure display area 3520, messages 3524 and 3526 are displayed as child messages of a message 3522.

As shown in FIG. 35B, sticky notes 3552, 3554, and 3556 are added to a board. The sticky note 3552 is associated with the message 3522, the sticky note 3554 is associated with the message 3524, and the sticky note 3556 is associated with the message 3526. In this case, the display attribute of the sticky note 3552 has been changed to that of the message 3522, the display attribute of the sticky note 3554 has been changed to that of the message 3524, and the display attribute of the sticky note 3556 has been changed to that of the message 3526. Conversely, the display attribute of the message 3522 may be changed to that of the sticky note 3552, the display attribute of the message 3524 may be changed to that of the sticky note 3554, and the display attribute of the message 3526 may be changed to that of the sticky note 3556.

The positional relationships among sticky notes may be set to be similar to those of messages. More specifically, arranging the sticky notes 3554 and 3556 vertically side by side under the sticky note 3552 on the board shows that the messages 3524 and 3526 associated with the sticky notes 3554 and 3556 are placed as child messages under the message 3522 associated with the sticky note 3552 in the tree structure.

FIGS. 36A, 36B, and 36C illustrate an example of processing executed in the exemplary embodiment. As stated above, one of the types of sticky notes is a ToDo type. If a sticky note is of a ToDo type, it may be added to a ToDo list as a ToDo issue.

FIG. 36A illustrates a message tree structure managed by the message processing device 100. Messages 3624 and 3626 are placed under a message 3622 as child messages of the message 3622.

FIG. 36B illustrates sticky notes 3652, 3654, 3656, and 3658 added to a board. The sticky notes 3652, 3654, and 3656 are associated with the messages 3622, 3624, and 3626, respectively.

The sticky note 3658 is a sticky note of a ToDo type. On the sticky note 3658, "Write specifications, due date: March 20, and person in charge: A", for example, is described.

FIG. 36C illustrates an example of the data structure of a ToDo list 3670. The ToDo list 3670 is managed by the ToDo management device 380. The ToDo list 3670 has a check field 3672, a person-in-charge field 3674, a ToDo content field 3676, and a due date field 3678. The check field 3672 indicates a check result. The person-in-charge field 3674 indicates a person in charge of a subject ToDo issue. The ToDo content field 3676 indicates the content of the subject ToDo issue. The due date field 3678 indicates the due date of the subject ToDo issue.

For example, the first row of the ToDo list 3670 shows that the person in charge of the ToDo issue is "A", the content of the ToDo issue is "Write specifications", and the due date of the ToDo issue is "March 20". These items of information originate from the sticky note 3658.

Figure 37:
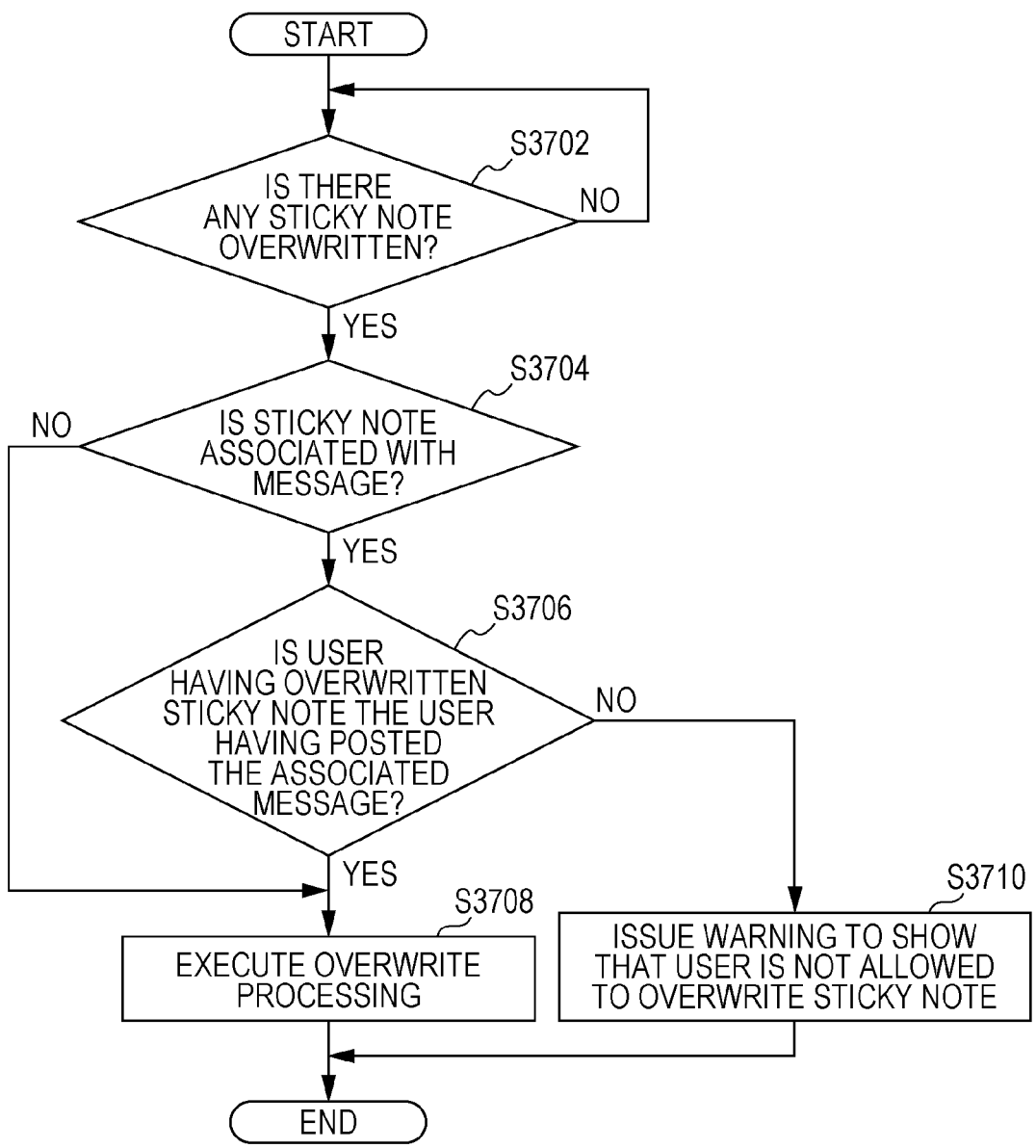
FIG. 37 is a flowchart illustrating an example of processing executed in the exemplary embodiment.

FIG. 37 is a flowchart illustrating an example of processing executed in the exemplary embodiment. More specifically, FIG. 37 illustrates processing executed by the sticky-note processing device 150 when a sticky note associated with a message has been overwritten.

In step S3702, the sticky-note processing device 150 judges whether the overwriting of a sticky note has been performed. If the overwriting of a sticky note has been performed, the sticky-note processing device 150 proceeds to step S3704. If the overwriting of a sticky note has not been performed, the sticky-note processing device 150 waits until a sticky note has been overwritten.

In step S3704, the sticky-note processing device 150 judges whether the sticky note is associated with a message. If the sticky note is associated with a message, the sticky-note processing device 150 proceeds to step S3706. If the sticky note is not associated with a message, the sticky-note processing device 150 proceeds to step S3708.

In step S3706, the sticky-note processing device 150 judges whether the user having overwritten the sticky note is the user having posted this message. If the user is the user having posted the message, the sticky-note processing device 150 proceeds to step S3708. If the user is not the user having posted the message, the sticky-note processing device 150 proceeds to step S3710.

In step S3708, the sticky-note processing device 150 executes overwrite processing for the sticky note.

In step S3710, the sticky-note processing device 150 issues a warning to show that the user is not allowed to overwrite the sticky note.

If a sticky note associated with a message is overwritten, instead of overwriting the associated message, the content of this sticky note may be written in another message as a child message of the associated message.

Figure 38B:
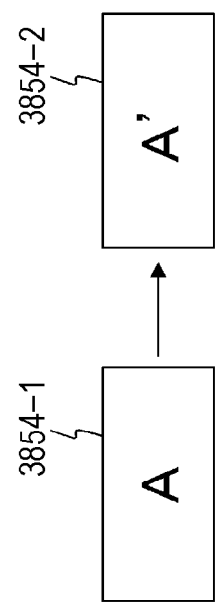
FIGS. 38A and 38B illustrate an example of processing executed in the exemplary embodiment.
Figure 38A:
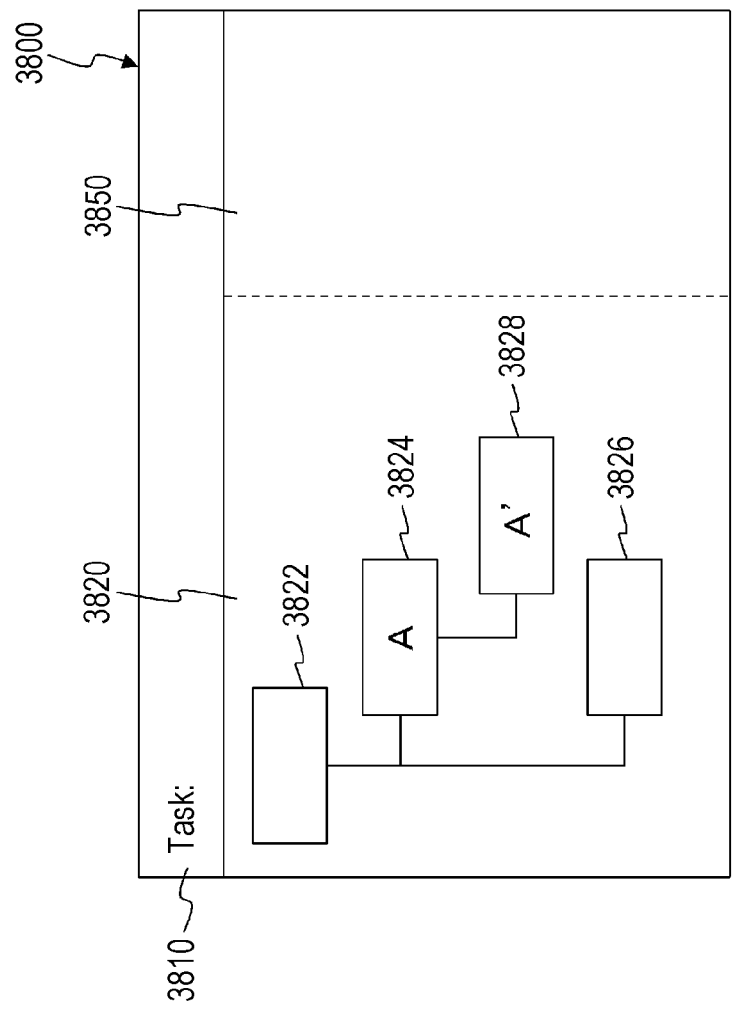

FIGS. 38A and 38B illustrate an example of processing executed in the exemplary embodiment.

It is now assumed that a sticky note 3854-1 is overwritten with a sticky note 3854-2, as shown in FIG. 38B. The sticky note 3854-1 is associated with a message 3824.

In this case, as shown in FIG. 38A, on a screen 3800, a message 3828 is added as a child message under the message 3824. The content of the sticky note 3854-2 is reflected in the content of the message 3828.

Figure 39:
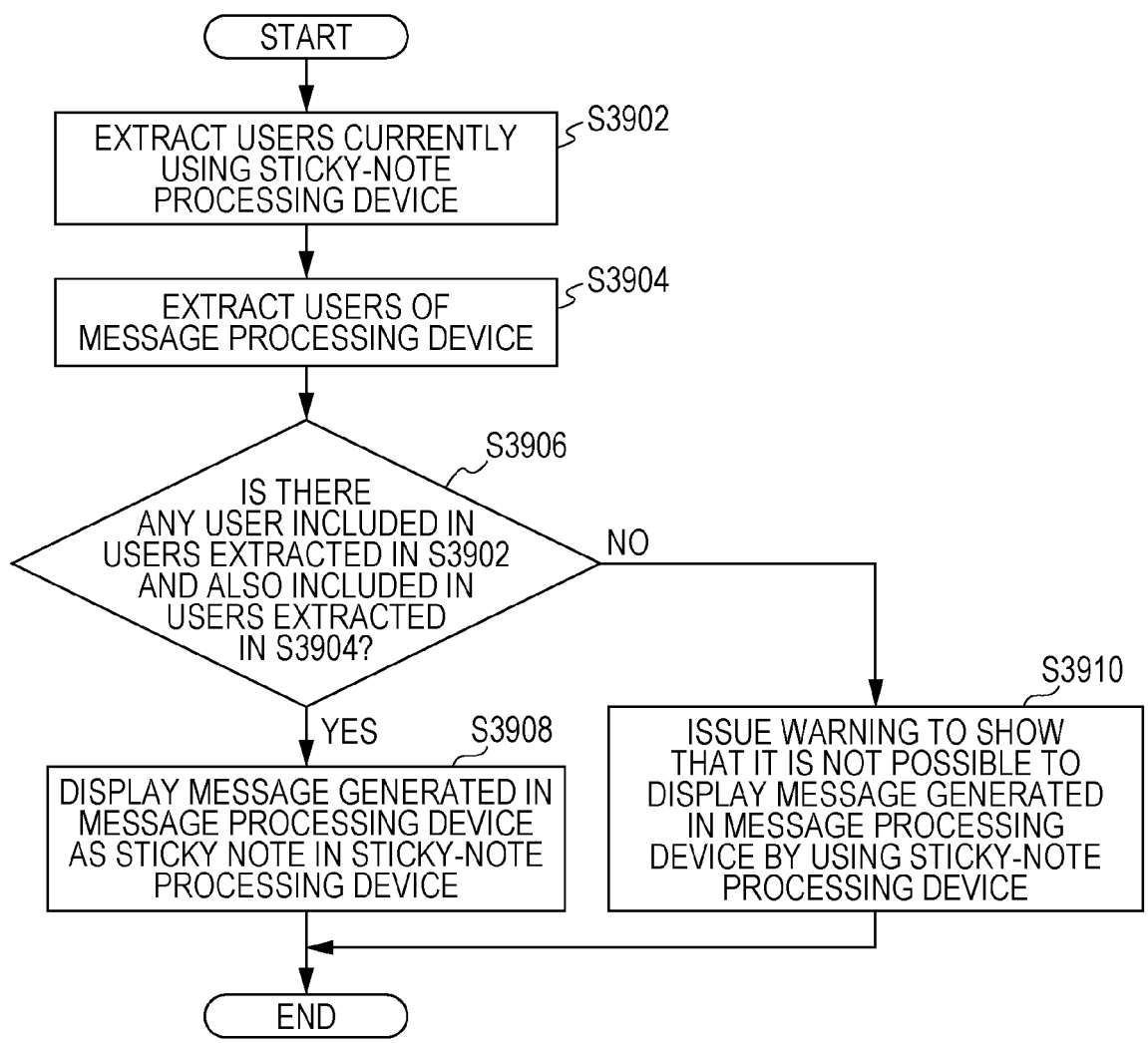
FIG. 39 is a flowchart illustrating an example of processing executed in the exemplary embodiment.

FIG. 39 is a flowchart illustrating an example of processing executed in the exemplary embodiment. More specifically, FIG. 39 illustrates an example of processing executed by the sticky-note processing device 150 to judge whether to execute collaborative processing with the message processing device 100.

In step S3902, the sticky-note processing device 150 extracts users currently using the sticky-note processing device 150.

In step S3904, the sticky-note processing device 150 extracts users of the message processing device 100, more specifically, users participating in a subject task by using the message processing device 100, that is, users allowed to post a message concerning the task. The subject task may be a predetermined task or a task specified by a user currently using the sticky-note processing device 150.

In step S3906, the sticky-note processing device 150 judges whether there is any user included in the users extracted in step S3902 and also included in the users extracted in step S3904. If there is such a user, the sticky-note processing device 150 proceeds to step S3908. If there is no user satisfying this condition, the sticky-note processing device 150 proceeds to step S3910. By executing step S3906, the sticky-note processing device 150 judges whether at least one of the users of the sticky-note processing device 150 is a user of the message processing device 100.

In step S3908, the sticky-note processing device 150 displays a message generated in the message processing device 100 as a sticky note in the sticky-note processing device 150. That is, converting from a message into a sticky note and vice versa is conducted with the collaboration between the message processing device 100 and the sticky-note processing device 150.

In step S3910, the sticky-note processing device 150 issues a warning to show that it is not possible to display a message generated in the message processing device 100 by using the sticky-note processing device 150. That is, the sticky-note processing device 150 is unable to display a message generated in the message processing device 100 as a sticky note in the sticky-note processing device 150 nor can it display a file attached to a message as a board.

Figure 40:
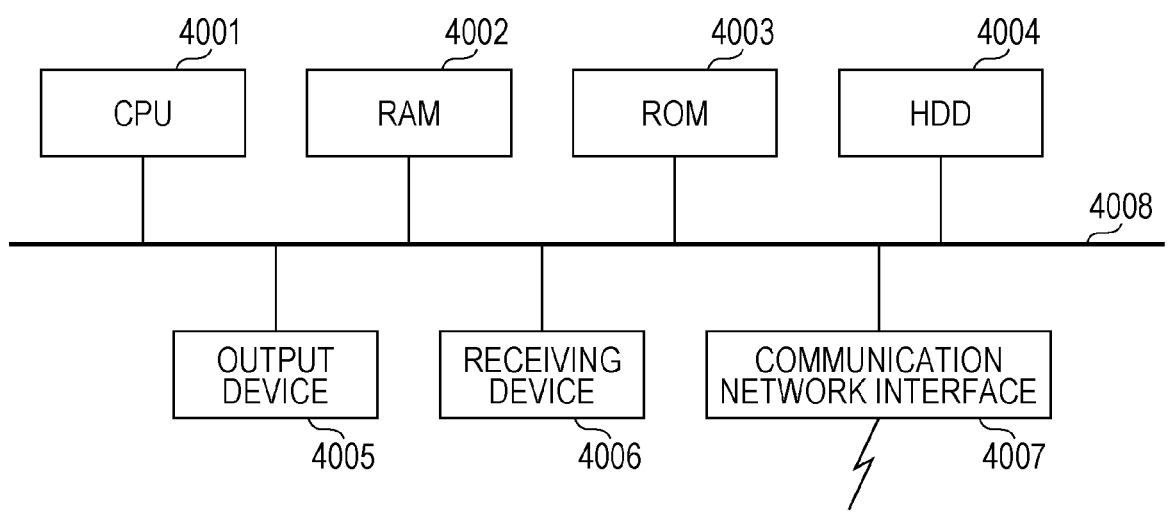
FIG. 40 is a block diagram illustrating an example of the hardware configuration of a computer implementing the exemplary embodiment.

The hardware configuration of a computer that executes a program serving as the exemplary embodiment (message processing devices 100 and 200, sticky-note processing devices 150 and 250, and a message-and-sticky-note associating device 230) is the configuration of a general computer, such as that of a personal computer (PC) or a server, as shown in FIG. 40. More specifically, such a computer uses a CPU 4001 as a processor (operation unit) and a RAM 4002, a read only memory (ROM) 4003, and a hard disk drive (HDD) 4004 as storage devices. As the HDD 4004, a hard disk or a solid state drive (SSD), which is a flash memory, may be used. The computer includes the CPU 4001, the RAM 4002, the ROM 4003, the HDD 4004, an output device 4005, a receiving device 4006, a communication network interface 4007, and a bus 4008. The CPU 4001 executes a program, such as the message control module 105, the communication module 110, the message display control module 120, the board-and-sticky-note control module 155, the communication module 160, the board display control module 170, the sticky-note display control module 175, the sticky-note adding module 185, the message adding module 190, the communication module 235, the sticky-note adding module 240, and the message adding module 245. The RAM 4002 stores this program and data therein. The ROM 4003 stores a program for starting the computer, for example. The HDD 4004 is an auxiliary storage device having functions, such as the message storage module 115 and the board-and-sticky-note storage module 165. Examples of the output device 4005 are a cathode ray tube (CRT), a liquid crystal display, and a speaker having functions such as the display modules 125 and 180. The receiving device 4006 receives data based on an operation (including motion, sound, and gaze) performed by a user on a keyboard, a mouse, a touchscreen, a microphone, or a camera (including a gaze detection camera). The communication network interface 4007 is, for example, a network interface card, for communicating with a communication network. The above-described elements are connected to one another via the bus 4008 and send and receive data to and from one another. The above-described computer may be connected to another computer configured similarly to this computer via a network.

In the above-described exemplary embodiment, concerning elements implemented by a software computer program, such a computer program is read into a system having the hardware configuration shown in FIG. 40, and the above-described exemplary embodiment is implemented by a combination of software and hardware resources.

The hardware configuration shown in FIG. 40 is only an example, and the exemplary embodiment may be configured in any manner in which the modules described in the exemplary embodiment are executable. For example, some modules may be configured as dedicated hardware (for example, an application specific integrated circuit (ASIC) or field programmable gate array (FPGA)), or some modules may be installed in an external system and be connected to the PC via a communication network. A system, such as that shown in FIG. 40, may be connected to a system, such as that shown in FIG. 40, via a communication network, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, or a multifunction device (image processing apparatus including two or more functions among a scanner, a printer, a copying machine, and a fax machine).

The above-described program may be stored in a recording medium and be provided. The program may be provided via a communication medium. If the program is stored in a recording medium, the above-described program may be implemented as a "non-transitory computer readable medium storing the program therein" in the exemplary embodiment.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a CD read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. Further, the program may be recorded in any form, for example, it may be compressed or encrypted, as long as it can be reconstructed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a first information processing apparatus including
a first display controller that performs control to display a parent message and a child message on a first display in a message form, the parent message comprises a file attached to the parent message, the child message being a message in reply to the parent message; and
a second information processing apparatus including
a second display controller that performs control to display the file attached to the parent message and a sticky note which shows the content of a child message on a second display in a sticky note form such that the sticky note is superposed on the file, and
a receiver that receives the file attached to the parent message and the child message from the first information processing apparatus, wherein,
when the receiver has received the file attached to the parent message and the child message, the second display controller performs control to display a sticky note which shows the content of the parent message and a sticky note which shows the content of the child message on the second display such that each sticky note is superposed on the file, in the second information processing apparatus, the parent message and the child message are converted from the message form to the sticky note form in which the sticky note is superposed on the file, in the first information processing apparatus, the sticky note form in which the sticky note is superposed on the file is converted to the message form.

2. The information processing system according to claim 1, wherein the second information processing apparatus further includes a first adder that adds, when another sticky note is added to the file, the content of the other sticky note as another child message by converting the content of the other sticky note into the message form in reply to the parent message in the first information processing apparatus.

3. The information processing system according to claim 2, wherein the first adder adds the content of a plurality of sticky notes as one message.

4. The information processing system according to claim 2, wherein:

the first adder adds the content of one sticky note as one message; and when a message in reply to a first message is added in the first information processing apparatus, the second display controller performs control to display a sticky note associated with the reply message on the file by relating the sticky note associated with the reply message to a sticky note associated with the first message.

5. The information processing system according to claim 2, wherein:

the second display controller performs control to display the sticky note by changing a display attribute of the sticky note in accordance with a user instruction; and the first adder changes an attribute of a message associated with the sticky note in the first information processing apparatus in accordance with the display attribute of the sticky note.

6. The information processing system according to claim 5, wherein the first adder does not add a message to the first information processing apparatus depending on a display attribute of the sticky note.

7. The information processing system according to claim 2, wherein, even if a sticky note is overwritten or deleted in the second information processing apparatus, the first adder does not overwrite or delete a message associated with the sticky note in the first information processing apparatus.

8. The information processing system according to claim 7, wherein, if a sticky note is overwritten in the second information processing apparatus, the first adder describes the overwritten content of the sticky note as a new child message and adds the new child message to the first information processing apparatus.

9. The information processing system according to claim 2, wherein the second display controller performs control to display a file and a sticky note, provided that at least one of users of the second information processing apparatus is a user of the first information processing apparatus.

10. The information processing system according to claim 1, wherein the second information processing apparatus further includes a second adder that adds, when another child message is added in reply to the parent message in the first information processing apparatus, another sticky note associated with the other child message to the file by converting the other child message into the sticky note form.

11. The information processing system according to claim 10, wherein the second display controller performs control to display a file and a sticky note, provided that at least one of users of the second information processing apparatus is a user of the first information processing apparatus.

12. The information processing system according to claim 1, wherein the second display controller performs control to display a sticky note by associating a plurality of messages with one sticky note.

13. The information processing system according to claim 1, wherein, when the parent message has an ancestor message in the first information processing apparatus, the second display controller performs control to display a sticky note corresponding to the content of the ancestor message on the file.

14. The information processing system according to claim 1, wherein the second display controller performs control to display a link within the sticky note, the link being used for causing the first display controller of the first information processing apparatus to perform control to display a message associated with the sticky note.

15. The information processing system according to claim 14, wherein, when a summary of the content of the message is described on the sticky note, the second display controller performs control to display the link.

16. The information processing system according to claim 1, wherein a user who is allowed to overwrite or delete a sticky note in the second information processing apparatus is restricted to a user having posted a message associated with the sticky note in the first information processing apparatus.

17. An information processing apparatus comprising:

a receiver that receives a file attached to a parent message and a child message from a different information processing apparatus, the child message being a message in reply to the parent message;

a display controller that performs control to display the file and a sticky note which shows the content of the child message on a display in a sticky note form such that the sticky note is superposed on the file; and a first adder that adds, when another sticky note is added to the file, the content of the other sticky note as another child message by converting the content of the other sticky note into a message form in reply to the parent message in the different information processing apparatus.

18. An information processing apparatus comprising:

a receiver that receives a file attached to a parent message and a child message from a different information processing apparatus, the child message being a message in reply to the parent message;

a display controller that performs control to display the file and a sticky note which shows the content of the child message on a display in a sticky note form such that the sticky note is superposed on the file; and a second adder that adds, when another child message is added in reply to the parent message in the different information processing apparatus, another sticky note associated with the other child message to the file by converting the other child message into the sticky note form.

* * * * *